United States Patent
Yukawa

(10) Patent No.: US 10,038,177 B2
(45) Date of Patent: *Jul. 31, 2018

(54) METHOD FOR MANUFACTURING STORAGE BATTERY ELECTRODE, STORAGE BATTERY ELECTRODE, STORAGE BATTERY, AND ELECTRONIC DEVICE

(71) Applicant: SEMICONDUCTOR ENERGY LABORATORY CO., LTD., Atsugi-shi, Kanagawa-ken (JP)

(72) Inventor: Mikio Yukawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,157

(22) Filed: Oct. 24, 2016

(65) Prior Publication Data

US 2017/0040590 A1    Feb. 9, 2017

Related U.S. Application Data

(63) Continuation of application No. 14/970,733, filed on Dec. 16, 2015, now Pat. No. 9,478,807, which is a
(Continued)

(30) Foreign Application Priority Data

Jun. 15, 2012 (JP) ................................. 2012-136194
Mar. 15, 2013 (JP) ................................. 2013-054310

(51) Int. Cl.
*H01M 4/04* (2006.01)
*H01M 4/64* (2006.01)
(Continued)

(52) U.S. Cl.
CPC ......... *H01M 4/0404* (2013.01); *H01M 4/043* (2013.01); *H01M 4/049* (2013.01);
(Continued)

(58) Field of Classification Search
CPC .... H01M 4/62; H01M 4/5808; H01M 4/5825; H01M 4/366; H01M 4/0471;
(Continued)

(56) References Cited

U.S. PATENT DOCUMENTS 4,302,518 A    11/1981    Goodenough et al.
4,668,595 A    5/1987    Yoshino et al.
(Continued)

FOREIGN PATENT DOCUMENTS

CN    102456869 A    5/2012
EP    2256087 A    12/2010
(Continued)

OTHER PUBLICATIONS

Zhang.J et al., "Reduction of graphene oxide via L-ascorbic acid", Chemical Communications, 2010, vol. 46, No. 7, pp. 1112-1114.
(Continued)

*Primary Examiner* — Jane Rhee
(74) *Attorney, Agent, or Firm* — Nixon Peabody LLP; Jeffrey L. Costellia

(57) ABSTRACT

To provide a method for forming a storage battery electrode including an active material layer with high density in which the proportion of conductive additive is low and the proportion of the active material is high. To provide a storage battery having a higher capacity per unit volume of an electrode with the use of a storage battery electrode formed by the formation method. A method for forming a storage battery electrode includes the steps of forming a mixture including an active material, graphene oxide, and a binder; providing a mixture over a current collector; and immersing
(Continued)

the mixture provided over the current collector in a polar solvent containing a reducer, so that the graphene oxide is reduced.

20 Claims, 23 Drawing Sheets

Related U.S. Application Data continuation of application No. 13/913,650, filed on Jun. 10, 2013, now Pat. No. 9,225,003.

(51) Int. Cl.
| | |
|---|---|
| H01M 4/13 | (2010.01) |
| H01M 4/136 | (2010.01) |
| H01M 4/139 | (2010.01) |
| H01M 4/1397 | (2010.01) |
| H01M 10/0525 | (2010.01) |
| H01M 4/36 | (2006.01) |
| H01M 4/58 | (2010.01) |
| H01M 4/62 | (2006.01) |

(52) U.S. Cl.
CPC ....... *H01M 4/0416* (2013.01); *H01M 4/0435* (2013.01); *H01M 4/0471* (2013.01); *H01M 4/13* (2013.01); *H01M 4/136* (2013.01); *H01M 4/139* (2013.01); *H01M 4/1397* (2013.01); *H01M 4/366* (2013.01); *H01M 4/5825* (2013.01); *H01M 4/625* (2013.01); *H01M 4/64* (2013.01); *H01M 10/0525* (2013.01); *H01M 4/5805* (2013.01); *H01M 4/62* (2013.01); *H01M 2220/30* (2013.01); *Y02E 60/122* (2013.01); *Y02P 70/54* (2015.11)

(58) Field of Classification Search
CPC .... H01M 4/0404; H01M 4/64; H01M 4/0435; H01M 4/043; H01M 4/0416; H01M 4/049; H01M 4/13; H01M 4/136; H01M 4/139; H01M 4/1397; H01M 4/625; H01M 10/0525; H01M 2220/30
See application file for complete search history.

(56) References Cited

U.S. PATENT DOCUMENTS

| | | | |
|---|---|---|---|
| 5,783,333 A | 7/1998 | Mayer | |
| 5,871,866 A | 2/1999 | Barker et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,179,561 B2 | 2/2007 | Niu et al. | |
| 7,572,542 B2 | 8/2009 | Naoi | |
| 7,658,901 B2 | 2/2010 | Prud'Homme et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 8,317,984 B2 | 11/2012 | Gilje | |
| 8,802,295 B2 | 8/2014 | Nesper et al. | |
| 9,045,346 B2 | 6/2015 | Nesper et al. | |
| 9,327,985 B2 | 5/2016 | Fugetsu | |
| 9,337,481 B2 | 5/2016 | Nesper et al. | |
| 9,548,494 B2 | 1/2017 | Nesper et al. | |
| 2001/0010807 A1 | 8/2001 | Matsubara | |
| 2002/0102459 A1 | 8/2002 | Hosoya et al. | |
| 2002/0195591 A1 | 12/2002 | Ravet et al. | |
| 2006/0051671 A1 | 3/2006 | Thackeray et al. | |
| 2007/0009799 A1 | 1/2007 | Zheng | |
| 2007/0117013 A1 | 5/2007 | Hosoya et al. | |
| 2007/0131915 A1 | 6/2007 | Stankovich et al. | |
| 2008/0048153 A1 | 2/2008 | Naoi | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0202915 A1 | 8/2009 | Modeki et al. | |
| 2009/0253045 A1 | 10/2009 | Kotato et al. | |
| 2009/0305135 A1 | 12/2009 | Shi et al. | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1* | 5/2011 | Amine | H01M 4/0402 252/502 |
| 2011/0136019 A1 | 6/2011 | Amiruddin et al. | |
| 2011/0159372 A1 | 6/2011 | Zhamu et al. | |
| 2011/0227000 A1 | 9/2011 | Ruoff et al. | |
| 2011/0229795 A1 | 9/2011 | Niu et al. | |
| 2012/0045692 A1 | 2/2012 | Takemura et al. | |
| 2012/0058397 A1 | 3/2012 | Zhamu et al. | |
| 2012/0064409 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0308884 A1 | 12/2012 | Oguni et al. | |
| 2012/0308891 A1 | 12/2012 | Todoriki et al. | |
| 2012/0315550 A1 | 12/2012 | Liu et al. | |
| 2012/0320492 A1* | 12/2012 | Radivojevic | H01G 11/14 361/291 |
| 2013/0015409 A1 | 1/2013 | Fugetsu | |
| 2013/0045156 A1 | 2/2013 | Nomoto et al. | |
| 2013/0047423 A1 | 2/2013 | Miwa et al. | |
| 2013/0084384 A1 | 4/2013 | Yamakaji | |
| 2013/0156942 A1 | 6/2013 | Yamakaji et al. | |
| 2013/0266859 A1 | 10/2013 | Todoriki et al. | |
| 2013/0266869 A1 | 10/2013 | Todoriki et al. | |
| 2014/0127562 A1 | 5/2014 | Nesper et al. | |

FOREIGN PATENT DOCUMENTS

| | | |
|---|---|---|
| EP | 2445049 A | 4/2012 |
| EP | 2698854 A | 2/2014 |
| JP | 07-105978 A | 4/1995 |
| JP | 2002-110162 A | 4/2002 |
| JP | 2010-275186 A | 12/2010 |
| JP | 2012-094516 A | 5/2012 |
| KR | 2012-0047782 A | 5/2012 |
| KR | 2013-0121799 A | 11/2013 |
| TW | 201232896 | 8/2012 |
| WO | WO-2006/071076 | 7/2006 |
| WO | WO-2011/074125 | 6/2011 |

OTHER PUBLICATIONS

Park.S et al., "Chemical structures of hydrazine-treated graphene oxide and generation of aromatic nitrogen doping", Nature Communications, Jan. 24, 2012, vol. 3, pp. 638-1-638-8.

Padhi.A et al., "Phospho-olivines as Positive-Electrode Materials for Rechargeable Lithium Batteries", J. Electrochem. Soc. (Journal of The Electrochemical Society), Apr. 1, 1997, vol. 144, No. 4, pp. 1188-1194.

Zhou.X et al., "Graphene modified LiFePO4 cathode materials for high power lithium ion batteries", J. Mater. Chem. (Journal of Materials Chemistry), 2011, vol. 21, pp. 3353-3358.

(56) References Cited

OTHER PUBLICATIONS

Sundaram.R et al., "Electrochemical Modification of Graphene", Adv. Mater. (Advanced Materials), Jul. 7, 2008, vol. 20, No. 16, pp. 3050-3053.

Zhou.M et al., "Controlled Synthesis of Large-Area and Patterned Electrochemically Reduced Graphene Oxide Films", Chemistry A European Journal, May 14, 2009, vol. 15, No. 25, pp. 6116-6120.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8373-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Shao.Y et al., "Facile and controllable electrochemical reduction of graphene oxide and its applications", J. Mater. Chem. (Journal of Materials Chemistry), 2010, vol. 20, No. 4, pp. 734-748.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Todoriki.H et al., "High performance lithium ion battery using Graphene Net electrode", 222nd ECS Meeting Abstract, Oct. 7, 2012, p. 1014, ECS.

Wang.Z et al., "Direct Electrochemical Reduction of Single-Layer Graphene Oxide and Subsequent Functionalization with Glucose Oxidase", J. Phys. Chem. C (Journal of Physical Chemistry C), 2009, vol. 113, No. 32, pp. 14071-14075.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Park.S et al., "Hydrazine-reduction of graphite-and graphene oxide", Carbon, Mar. 15, 2011, vol. 49, No. 9, pp. 3019-3023, Elsevier.

Dreyer.D et al., "The Chemistry of Graphene Oxide", Chemical Society Reviews, Nov. 3, 2009, vol. 39, No. 1, pp. 228-240.

\* cited by examiner

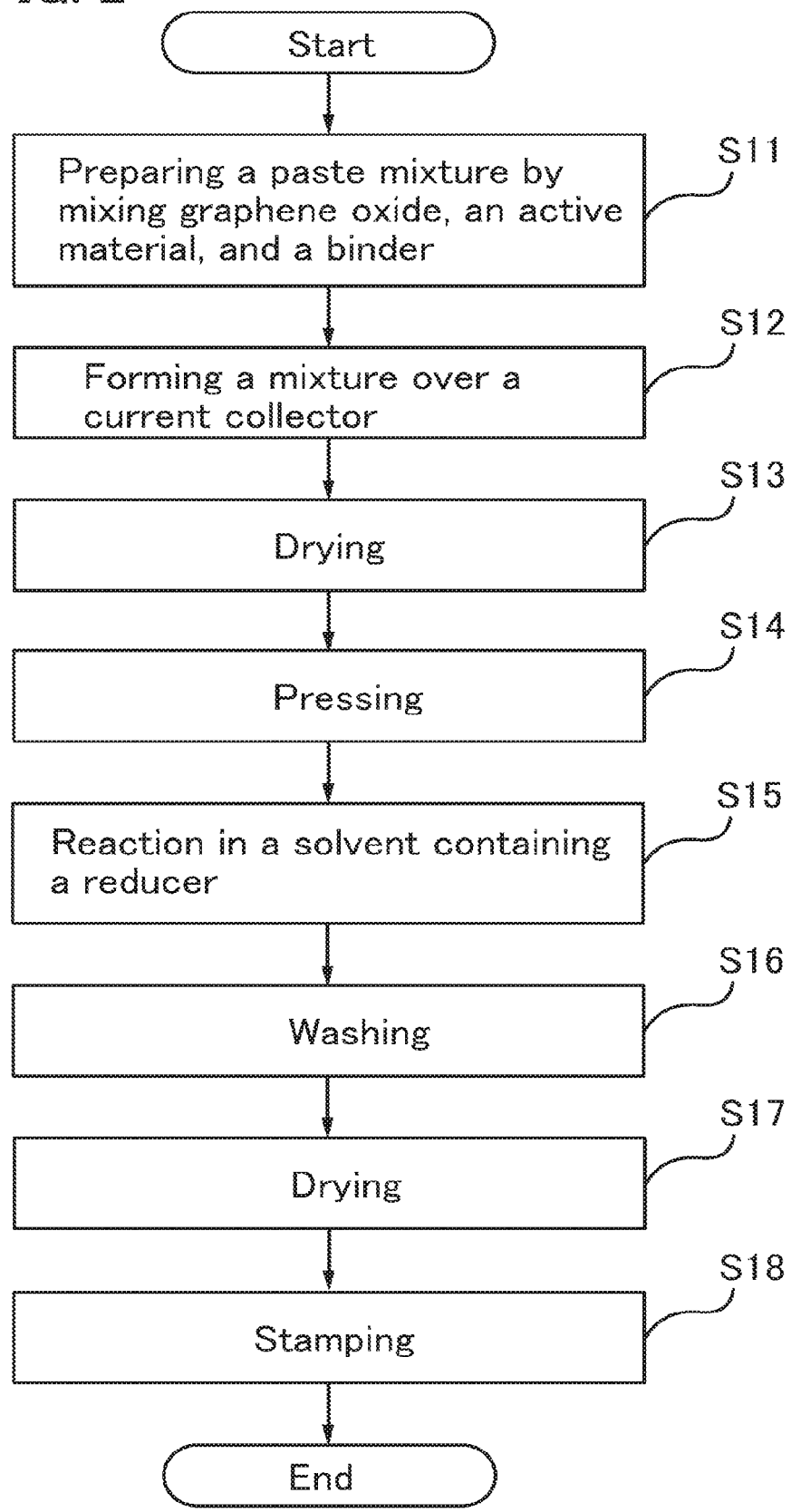

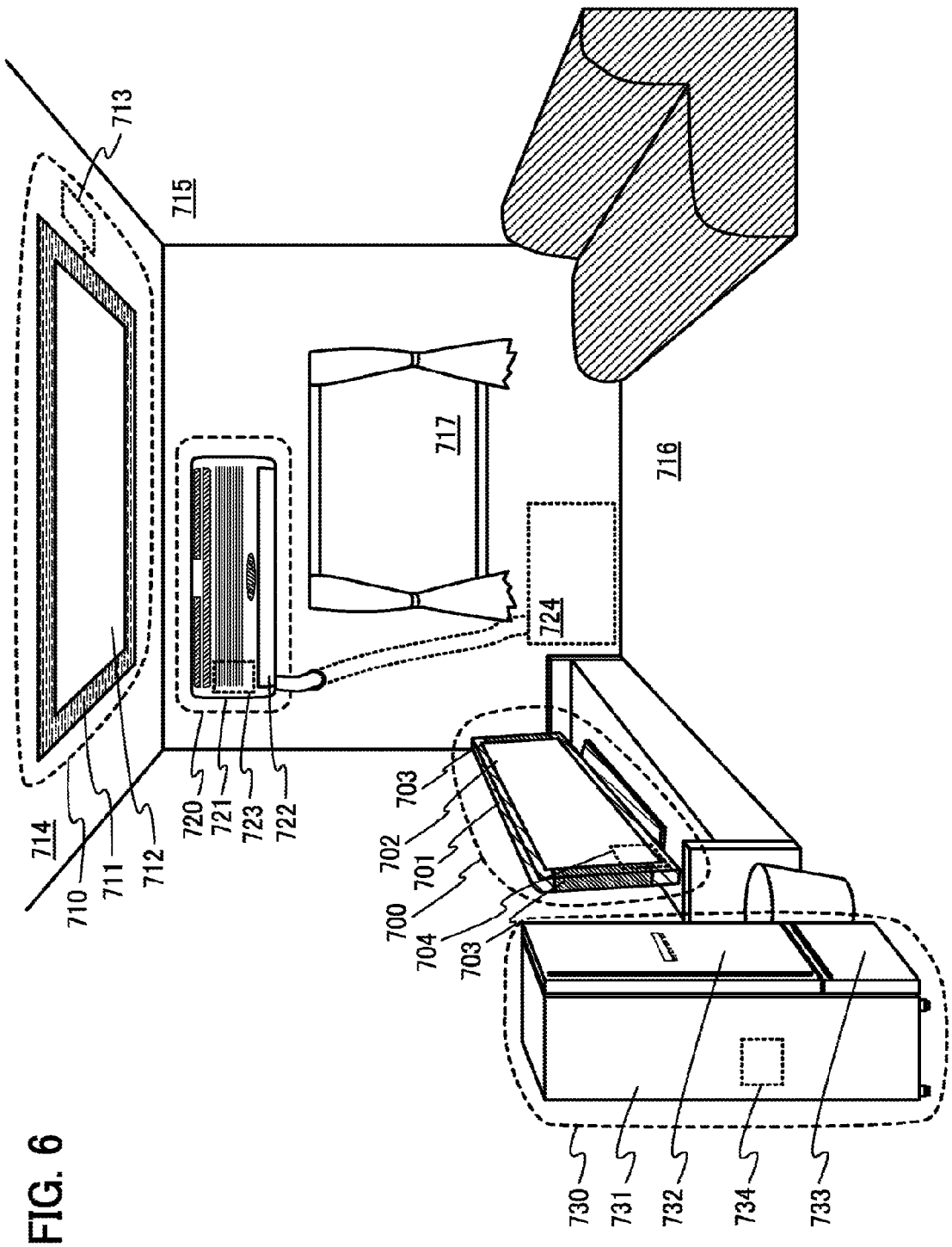

860

860  864
    862
863
      861 US 10,038,177 B2

METHOD FOR MANUFACTURING STORAGE BATTERY ELECTRODE, STORAGE BATTERY ELECTRODE, STORAGE BATTERY, AND ELECTRONIC DEVICE

BACKGROUND OF THE INVENTION

1. Field of the Invention

The present invention relates to a method for manufacturing a storage battery electrode.

2. Description of the Related Art

With the recent rapid spread of portable electronic devices such as mobile phones, smartphones, electronic books, and portable game machines, secondary batteries for drive power supply have been increasingly required to be smaller and to have higher capacity. Storage batteries typified by lithium secondary batteries, which have advantages such as high energy density and high capacity, have been widely used as secondary batteries used for portable electronic devices.

A lithium secondary battery, which is one of storage batteries and widely used due to its high energy density, includes a positive electrode including an active material such as lithium cobalt oxide ($LiCoO_2$) or lithium iron phosphate ($LiFePO_4$), a negative electrode formed of a carbon material such as graphite capable of reception and release of lithium ions, a nonaqueous electrolyte in which an electrolyte formed of a lithium salt such as $LiBF_4$ or $LiPF_6$ is dissolved in an organic solvent such as ethylene carbonate or diethyl carbonate, and the like. A lithium secondary battery is charged and discharged in such a way that lithium ions in the secondary battery are transferred between the positive electrode and the negative electrode through the nonaqueous electrolyte and intercalated into or deintercalated from the active materials of the positive electrode and the negative electrode.

A binder is mixed into the positive electrode or the negative electrode in order that active materials can be bound or an active material and a current collector can be bound. Since the binder is generally an organic high molecular compound such as polyvinylidene fluoride (PVDF) which has an insulating property, the electric conductivity of the binder is extremely low. Therefore, as the ratio of the mixed binder to the active material is increased, the amount of the active material in the electrode is relatively decreased, resulting in the lower discharge capacity of the secondary battery.

Hence, by mixture of a conductive additive such as acetylene black (AB) or graphite particles, the electric conductivity between active materials or between an active material and a current collector can be improved. Thus, a positive electrode active material with high electric conductivity can be provided (see Patent Document 1).

REFERENCE

[Patent Document 1] Japanese Published Patent Application No. 2002-110162

SUMMARY OF THE INVENTION

However, because acetylene black used as a conductive additive is a high-volume particle with an average diameter of several tens of nanometers to several hundreds of nanometers, contact between acetylene black and an active material hardly becomes surface contact and tends to be point contact. Consequently, contact resistance between the active material and the conductive additive is high. Further, if the amount of the conductive additive is increased to increase contact points between the active material and the conductive additive, the proportion of the amount of the active material in the electrode decreases, resulting in the lower discharge capacity of the battery.

In the case where graphite particles are used as a conductive additive, natural graphite is generally used in consideration of cost. In this case, iron, lead, copper, or the like contained as an impurity in a graphite particle reacts with the active material or the current collector, which might reduce the potential or capacity of the battery.

Further, as particles of the active material become minuter, cohesion between the particles becomes stronger, which makes uniform dispersion in the binder or the conductive additive difficult. Consequently, a portion where active material particles are aggregated and densely present and a portion where active material particles are not aggregated and thinly present are locally generated. In the portion where active material particles are aggregated and to which the conductive additive is not mixed, the active material particles do not contribute to formation of the discharge capacity of the battery.

In view of the above problems, an object of one embodiment of the present invention is to provide a method for forming a storage battery electrode including an active material layer with high density in which the proportion of conductive additive is low and the proportion of the active material is high. Another object of one embodiment of the present invention is to provide a storage battery having a higher capacity per unit volume of an electrode with the use of a storage battery electrode formed by the formation method.

In view of the above objects, graphene is used instead of acetylene black or the like as a conductive additive included in an electrode of one embodiment of the present invention. In particular, graphene oxide with high dispersibility is used as a raw material and is mixed with an active material and the like to form a mixture, the mixture is provided over a current collector, and then reduction treatment is performed, so that an electrode including graphene as a conductive additive is formed.

Graphene is a carbon material having a crystal structure in which hexagonal skeletons of carbon are spread in a planar form and is one atomic plane extracted from graphite crystals. Due to its electrical, mechanical, or chemical characteristics which are surprisingly excellent, the graphene has been expected to be used for a variety of fields of, for example, field-effect transistors with high mobility, highly sensitive sensors, highly-efficient solar cells, and next-generation transparent conductive films and has attracted a great deal of attention.

Note that graphene in this specification refers to single-layer graphene or multilayer graphene including two or more and hundred or less layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of the oxygen is higher than or equal to 2 at. % and lower than or equal to 20 at. %, preferably higher than or equal to 3 at. % and lower than or equal to 15 at. %.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the power storage device of one embodiment of the present invention is longer than that in general graphite, carrier ions can easily transfer between the graphenes in multilayer graphene.

In a storage battery electrode of one embodiment of the present invention, such graphenes are used as a conductive additive of the electrode. However, in the case where a storage battery is formed in such a manner that graphenes or graphenes formed by reducing graphene oxides in advance (RGO (abbreviation of reduced graphene oxide)) are mixed with an active material and a binder, the graphenes or the RGOs aggregate in the electrode because of its low dispersibility and thus it is difficult to achieve favorable battery characteristics.

On the other hand, in the case of using graphene oxide as a raw material of a conductive additive of an electrode, after a mixture formed by mixing graphene oxide, an active material, and a binder in a polar solvent is provided over a current collector, the graphene oxide is reduced by reduction treatment, so that graphene can be formed. When an electrode is formed using this method, a graphene network for electric conduction is formed in an active material layer including an active material and a binder. Thus, a storage battery electrode including a highly conductive active material layer where active materials are electrically connected to each other by graphene can be formed.

This is because graphene oxide used as a raw material of graphene is a polar material having a functional group such as an epoxy group, a carbonyl group, a carboxyl group, or a hydroxyl group. Oxygen in the functional group in graphene oxide is negatively charged in a polar solvent; hence, graphene oxides do not easily aggregate but strongly interact with the polar solvent such as NMP. Thus, the functional group such as an epoxy group in the graphene oxide interacts with the polar solvent, which probably prevents aggregation among graphene oxides, resulting in uniform dispersion of the graphene oxide in a dispersion medium.

When graphene oxide is used as a raw material of a conductive additive as described above, the graphene oxide has high dispersibility in a disperse medium but has low conductivity and thus does not function as a conductive additive without any change. For this reason, in forming a storage electrode, after at least an active material and the like and graphene oxide are mixed, the graphene oxide needs to be reduced to form highly conductive graphene.

Examples of a method for reducing graphene oxide are reduction treatment with heating (hereinafter referred to as thermal reduction treatment), electrochemical reduction treatment performed by application of a potential at which graphene oxide is reduced in an electrolytic solution (hereinafter referred to as electrochemical reduction), and reduction treatment using a chemical reaction caused with a reducer (hereinafter referred to as chemical reduction).

In forming a storage battery electrode using graphene oxide as a raw material of a conductive additive, the heat treatment temperature for thermal reduction treatment is limited to lower than or equal to a temperature which exceeds the upper temperature limit of materials of the electrode. This is because the graphene oxide cannot be reduced until it is mixed with an active material and a binder, in order that high dispersibility of the graphene oxide can be kept. On the other hand, after the graphene oxide is mixed with an active material and a binder, it is not possible to perform heat treatment at a temperature higher than or equal to the upper temperature limit of the binder such as PVDF and higher than or equal to the upper temperature limit of the material of a current collector. Thus, it is difficult to sufficiently reduce graphene oxide in a stage of formation of a storage battery electrode.

In the case of performing electrochemical reduction treatment, it is necessary to sufficiently apply voltage evenly to a storage battery electrode under the condition where an electrolytic solution does not dissolve materials of the electrode.

Thus, chemical reduction treatment is employed to reduce graphene oxide in a method for forming a storage battery electrode of the present invention. The chemical reduction treatment is performed using a reducer.

One embodiment of the present invention is a method for forming a storage battery electrode, which includes the steps of forming a mixture including an active material, graphene oxide, and a binder; providing the mixture over a current collector; and immersing the mixture provided over the current collector in a polar solvent containing a reducer, so that the graphene oxide is reduced.

Graphene oxide used as a raw material of a conductive additive can be formed by any of a variety of synthesis methods such as a Hummers method, a modified Hummers method, or oxidation of a graphite material. Note that a method for forming a storage battery electrode of the present invention is not limited by the degree of separation of graphene oxides.

Examples of the reducer are ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof. In particular, ascorbic acid and hydroquinone are preferable to hydrazine and $NaBH_4$ in that they are safe due to low reducing ability and utilized industrially with ease.

A polar solvent can be used as the solvent. Any material can be used for the polar solvent as long as it can dissolve the reducer. Examples of the material of the polar solvent are water, methanol, ethanol, acetone, tetrahydrofuran (THF), dimethylformamide (DMF), N-methylpyrrolidone (NMP), dimethyl sulfoxide (DMSO), and a mixed solution of any two or more of the above.

Note that heating can facilitate chemical reduction reaction of one embodiment of the present invention. After drying following the chemical reduction, heating may further be performed.

A storage battery electrode can be formed by the above formation method.

A method for forming a storage battery electrode including an active material layer with high density in which the proportion of conductive additive is low and the proportion of the active material is high can be provided.

The use of the storage battery electrode enables fabrication of a storage battery having high capacity per unit volume of the electrode.

In particular, graphene oxide can be reduced at a reaction temperature sufficiently lower than that in the case of reducing graphene oxide by heat treatment.

Further, a reducer which has weaker toxicity, e.g., ascorbic acid can be used instead of a highly toxic reducer (i.e., a reducer with high reducing ability) such as hydrazine. The use of such a reducer allows fabrication of a storage battery electrode through highly safe chemical reduction of graphene oxide.

BRIEF DESCRIPTION OF THE DRAWINGS

In the accompanying drawings:
FIG. 2 is a flow chart showing a method for forming an electrode;
FIG. 6 illustrates electronic devices.

DETAILED DESCRIPTION OF THE INVENTION

Hereinafter, embodiments and examples will be described with reference to drawings. However, the embodiments and examples can be implemented in many different modes, and it will be readily appreciated by those skilled in the art that modes and details thereof can be changed in various ways without departing from the spirit and scope of the present invention. Thus, the present invention should not be interpreted as being limited to the following descriptions of the embodiments and examples.

(Embodiment 1)

In this embodiment, a method for forming a storage battery electrode of one embodiment of the present invention will be described with reference to FIGS. 1A to 1C and FIG. 2.

Figure 1A:
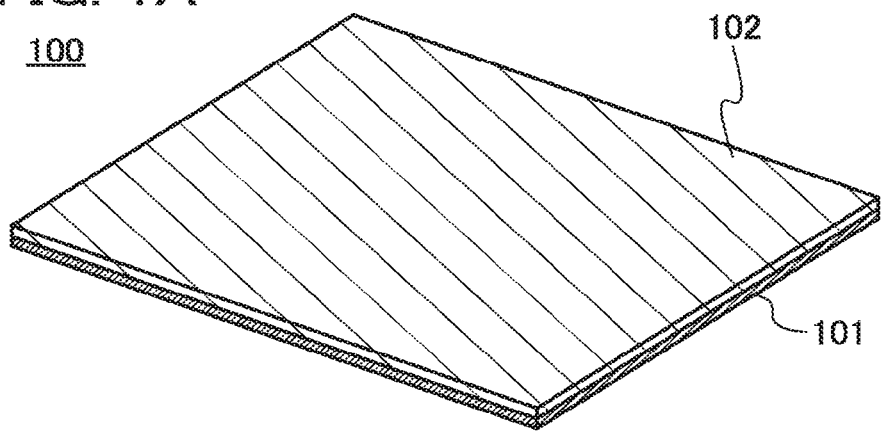
FIGS. 1A to 1C illustrate a storage battery electrode.
Figure 1B:
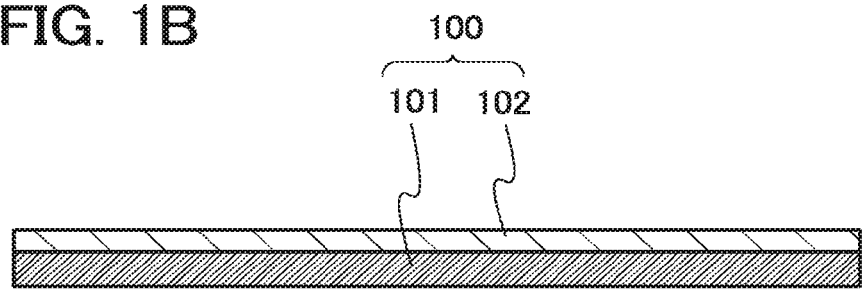

FIG. 1A is a perspective view of a storage battery electrode 100, and FIG. 1B is a longitudinal sectional view of the storage battery electrode 100. Although the storage battery electrode 100 in the shape of a rectangular sheet is illustrated in FIG. 1A, the shape of the storage battery electrode 100 is not limited thereto and may be any appropriate shape. An active material layer 102 is formed over only one surface of a current collector 101 in FIGS. 1A and 1B; however, active material layers 102 may be formed so that the current collector 101 is sandwiched therebetween. The active material layer 102 does not necessarily need to be formed over the entire surface of the current collector 101 and a region that is not coated, such as a region for connection to an electrode tab, is provided as appropriate.

The current collector 101 can be formed using a highly conductive material which is not alloyed with a carrier ion of lithium or the like, such as a metal typified by stainless steel, gold, platinum, zinc, iron, nickel, copper, aluminum, titanium, or tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collector 101 can have a foil-like shape, a plate-like shape (sheet-like shape), a net-like shape, a cylindrical shape, a coil shape, a punching-metal shape, an expanded-metal shape, or the like as appropriate. The current collector 101 preferably has a thickness of 10 μm to 30 μm inclusive.

Figure 1C:
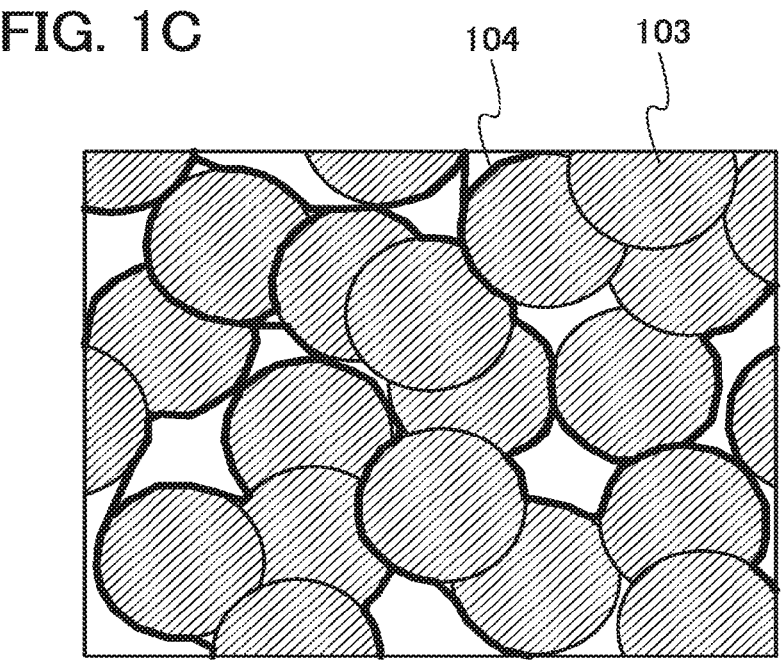

FIG. 1C is a longitudinal sectional view of the active material layer 102. The active material layer 102 includes active material particles 103, graphenes 104 as a conductive additive, and a binder (not illustrated).

The longitudinal section of the active material layer 102 in FIG. 1C shows substantially uniform dispersion of the sheet-like graphenes 104 in the active material layer 102. The graphenes 104 are schematically shown by heavy lines in FIG. 1C but are actually thin films each having a thickness corresponding to the thickness of a single layer or a multiple layer of carbon molecules. The plurality of graphenes 104 are formed in such a way as to wrap, coat, or be adhered to a plurality of the active material particles 103, so that the graphenes 104 make surface contact with the active material particles 103. Further, the graphenes 104 are also in surface contact with each other; consequently, the plurality of graphenes 104 form a three-dimensional network for electric conduction.

This is because graphene oxides with extremely high dispersibility in a polar solvent are used for formation of the graphenes 104. The solvent is removed by volatilization from a dispersion medium containing the graphene oxides uniformly dispersed and the graphene oxides are reduced to give graphenes; hence, the graphenes 104 remaining in the active material layer 102 partly overlap with each other and are dispersed such that surface contact is made, thereby forming a path for electric conduction.

Unlike a conductive additive in the form of particles, such as acetylene black, which makes point contact with an active material, the graphenes 104 are capable of surface contact with low contact resistance; accordingly, the electric conduction of the active material particles 103 and the graphenes 104 can be improved without an increase in the amount of a conductive additive. Thus, the proportion of the active material particles 103 in the active material layer 102 can be increased. Accordingly, the discharge capacity of a storage battery can be increased.

FIG. 2 is a flow chart showing a method for forming a storage battery electrode of one embodiment of the present invention. First, an active material, a binder, and graphene oxide are prepared.

For the active material particles 103, a material into and from which carrier ions such as lithium ions can be inserted and extracted is used. The active material particles 103 can be in the form of particles made of secondary particles with average diameter or diameter distribution, which are obtained in such a way that material compounds are mixed at a predetermined ratio and baked and the resulting baked product is crushed, granulated, and classified by an appropriate means. Therefore, the active material particles 103 are schematically illustrated as spheres in FIG. 1C; however, the shape of the active material particles 103 is not limited to this shape.

The average diameter of a primary particle of the active material particles 103 is less than or equal to 500 nm, preferably greater than or equal to 50 nm and less than or equal to 500 nm. To make surface contact with a plurality of the active material particles 103, the graphenes 104 preferably have sides the length of each of which is greater than or equal to 50 nm and less than or equal to 100 μm, more preferably greater than or equal to 800 nm and less than or equal to 20 μm.

When a storage battery electrode is formed to be used as a positive electrode of a storage battery, a material into and from which lithium ions can be inserted and extracted can be used for the active material particles 103; for example, a lithium-containing composite oxide with an olivine crystal structure, a layered rock-salt crystal structure, or a spinel crystal structure can be used. For the active material particles 103, a compound such as $LiFeO_2$, $LiCoO_2$, $LiNiO_2$, $LiMn_2O_4$, $V_2O_5$, $Cr_2O_5$, or $MnO_2$ can be used.

Typical examples of an olivine-type lithium-containing composite oxide ($LiMPO_4$ (general formula) (M is one or more of Fe(II), Mn(II), Co(II), and Ni(II))) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly satisfies conditions necessary for the positive electrode active material, such as safety, stability, high capacity density, high potential, and the existence of lithium ions which can be extracted in initial oxidation (charging).

Examples of a lithium-containing composite oxide with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ (0<x<1)) such as $LiNi_{0.8}Co_{0.2}O_2$, NiMn-containing composite oxide (general formula: $LiNi_xMn_{1-x}O_2$ (0<x<1)) such as $LiNi_{0.5}Mn_{0.5}O_2$, NiMnCo-containing composite oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because of its advantages such as high capacity and stability in the air higher than that of $LiNiO_2$ and thermal stability higher than that of $LiNiO_2$. Examples of a lithium-containing composite oxide with a spinel crystal structure are $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to lithium-containing composite oxide with a spinel crystal structure which contains manganese such as $LiMn_2O_4$ because advantages such as minimization of the elution of manganese and the decomposition of an electrolytic solution can be obtained.

Alternatively, a lithium-containing composite oxide such as $Li_{(2-j)}MSiO_4$ (general formula) (M is one or more of Fe(II), Mn(II), Co(II), and Ni(II), 0≤j≤2) can be used for the active material particles 103. Typical examples of $Li_{(2-j)}MSiO_4$ (general formula) are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the active material particles 103. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a lithium-containing composite oxide with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, alkaline-earth metal ions, beryllium ions, or magnesium ions, the following may be used as the positive electrode active material: a compound or a composite oxide which is obtained by substituting an alkali metal (e.g., sodium or potassium), an alkaline-earth metal (e.g., calcium, strontium, or barium), beryllium, or magnesium for lithium in the lithium compound or the lithium-containing composite oxide.

When a storage battery electrode is formed to be used as a negative electrode of a storage battery, a material with which lithium can be dissolved and precipitated or a material into and from which lithium ions can be inserted and extracted can be used for the active material particles 103; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the active material particles 103, an alloy-based material which enables charge-discharge reaction by alloying and dealloying reaction with a lithium metal can be used. For example, a material containing at least one of Al, Si, Ge, Sn, Pb, Sb, Bi, Ag, Au, Zn, Cd, In, Ga, and the like can be given. Such elements have higher capacity than carbon. In particular, silicon has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the active material particles 103, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the active material particles 103, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material; for example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, RuOz, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

As the binder, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The graphene oxide is a raw material of the graphene 104 which serves as a conductive additive later. The graphene oxide can be formed by any of a variety of synthesis methods such as a Hummers method, a modified Hummers method, or oxidation of a graphite material. Note that the method for forming a storage battery electrode of the present invention is not limited by the degree of separation of the graphene oxides.

For example, in a Hummers method, graphite such as flake graphite is oxidized to give graphite oxide. The obtained graphite oxide is graphite which is oxidized in places and thus to which a functional group such as a carbonyl group, a carboxyl group, or a hydroxyl group is bonded. In the graphite oxide, the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. Particularly in the case where the flake size is smaller than the average diameter of the active material particles 103, surface contact with a plurality of the active material particles 103 and connection between graphenes are difficult, resulting in difficulty in increasing the electric conductivity of the active material layer 102.

The graphene oxide, the active material, and the binder described above are added to a polar solvent such as N-methylpyrrolidone (NMP) or dimethylformamide, and they are mixed to prepare a paste mixture (Step S11). When a material which significantly interacts with graphene oxide is used for the active material particles 103, graphene oxides can be more evenly dispersed in the active material layer 102.

Note that the amount of graphene oxide is set to 0.1 wt % to 10 wt % inclusive, preferably 0.1 wt % to 5 wt % inclusive, more preferably 0.2 wt % to 1 wt % inclusive with respect to the total weight of the mixture of the graphene oxide, the positive electrode active material, the conductive additive, and the binder. On the other hand, the graphene obtained after a positive electrode paste is applied to the current collector and reduction is performed is included at least at 0.05 wt % to 5 wt % inclusive, preferably 0.05 wt % to 2.5 wt % inclusive, more preferably 0.1 wt % to 0.5 wt % inclusive with respect to the total weight of a positive electrode active material layer. This is because the weight of the graphene is reduced by almost half due to the reduction of the graphene oxide.

Note that a polar solvent may be further added after the mixing so that the viscosity of the mixture can be adjusted. Mixing and addition of a polar solvent may be repeated plural times.

Next, the mixture is formed over one surface of the current collector or formed so that the current collector is sandwiched therebetween by a coating method such as a doctor blade method (Step S12).

The mixture formed over the current collector is dried by a method such as ventilation drying or reduced pressure (vacuum) drying (Step S13). The drying is preferably performed using a hot wind with a temperature of 50° C. to 180° C. inclusive. Through this step, the polarity solvent contained in the active material layer 102 is evaporated. Note that there is no particular limitation on the atmosphere.

The active material layer 102 is pressed by a compression method such as a roll press method or a flat plate press method so as to be consolidated (Step S14).

Next, reaction is caused in a solvent containing a reducer (Step S15). Through this step, the graphene oxide included in the active material layer is reduced to form the graphene 104. Note that it is possible that oxygen in the graphene oxide is not necessarily entirely released and partly remains in the graphene. When the graphene 104 contains oxygen, the proportion of the oxygen is 2% to 20% inclusive, preferably 3% to 15% inclusive. This reduction treatment is preferably performed at higher than or equal to room temperature and lower than or equal to 150° C. In the method for forming a storage battery electrode, the reduction treatment is preferably performed at higher than or equal to room temperature and lower than or equal to 150° C.

Examples of the reducer are ascorbic acid, hydrazine, dimethyl hydrazine, hydroquinone, sodium boron hydride (NaBH$_4$), tetra butyl ammonium bromide (TBAB), LiAlH$_4$, ethylene glycol, polyethylene glycol, N,N-diethylhydroxylamine, and a derivative thereof.

A polar solvent can be used as the solvent. Any material can be used for the polar solvent as long as it can dissolve the reducer. Examples of the material of the polar solvent are water, methanol, ethanol, acetone, tetrahydrofuran (THF), dimethylformamide (DMF), N-methylpyrrolidone (NMIP), dimethyl sulfoxide (DMSO), and a mixed solution of any two or more of the above.

After that, washing (Step S16) and drying (Step S17) are performed. The drying is preferably performed in a reduced pressure (vacuum) atmosphere or a reduction atmosphere. This drying step is performed at, for example, 50° C. to 200° C. inclusive in vacuum for 1 hour to 48 hours inclusive. The drying allows evaporation, volatilization, or removal of the polar solvent and moisture in the active material layer 102.

Finally, stamping is carried out so that the current collector and the active material layer have a predetermined size (Step S18), whereby a storage battery electrode is formed.

Note that heating can facilitate the reduction reaction. After the drying following the chemical reduction, heating may further be performed.

In the steps described above, the active material layer 102 is pressed in Step S14; however, pressing may be further performed after the washing step in Step S16 or after the drying step in Step S17, in which case pressing in Step S14 can be skipped.

Through the above steps, the storage battery electrode 100 including the active material layer 102 where the graphenes 104 are evenly dispersed to the active material particles 103 can be formed.

This embodiment can be implemented in combination with any of the other embodiments as appropriate.

(Embodiment 2)

In this embodiment, the structure of a storage battery including a storage battery electrode formed by the formation method described in Embodiment 1 will be described with reference to FIGS. 3A and 3B, FIG. 4, and FIGS. 5A and 5B.

(Coin-Type Storage Battery)

Figure 3A:
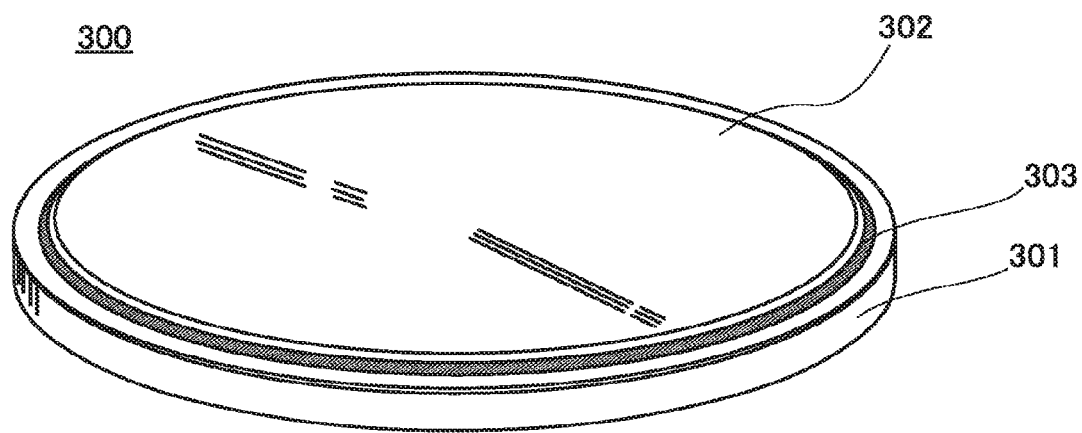
FIGS. 3A and 3B illustrate a coin-type secondary battery.
Figure 3B:
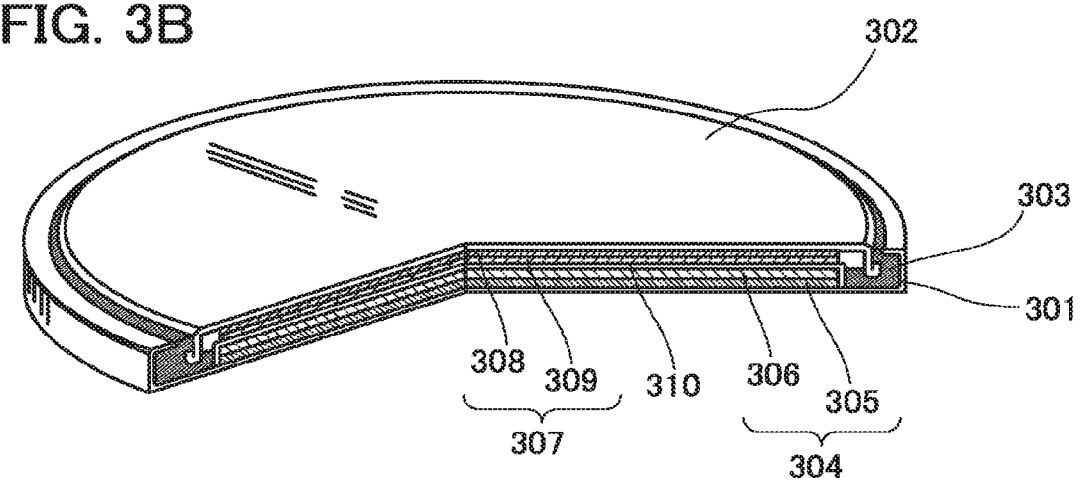

FIG. 3A is an external view of a coin-type (single-layer flat type) storage battery, and FIG. 3B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310 and an electrolytic solution (not illustrated) are provided between the positive electrode active material layer 306 and the negative electrode active material layer 309.

As the positive electrode 304 and the negative electrode 307, storage battery electrodes formed by the method for forming a storage battery of one embodiment of the present invention, which is described in Embodiment 1, can be used.

As the separator 310, an insulator such as cellulose (paper), or polyethylene or polypropylene with pores can be used.

As an electrolyte in the electrolytic solution, a material which contains carrier ions is used. Typical examples of the electrolyte are lithium salts such as LiPF$_6$, LiClO$_4$, LiAsF$_6$, LiBF$_4$, LiCF$_3$SO$_3$, Li(CF$_3$SO$_2$)$_2$N, and Li(C$_2$F$_5$SO$_2$)$_2$N. One of these electrolytes may be used alone or two or more of them may be used in an appropriate combination and in an appropriate ratio.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for the electrolyte.

As a solvent of the electrolytic solution, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Further, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging or the like.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 3B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Laminated Storage Battery>

Next, an example of a laminated storage battery will be described with reference to FIG. 4.

Figure 4:
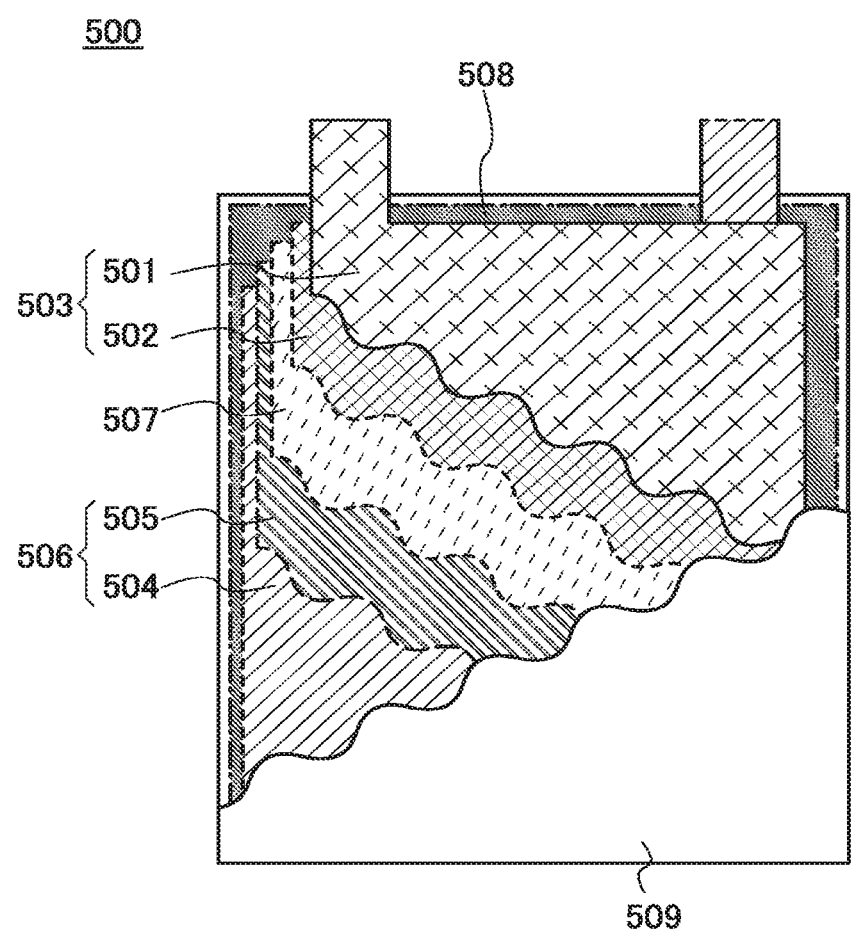
FIG. 4 illustrates a laminated secondary battery.

A laminated storage battery 500 illustrated in FIG. 4 is formed with a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The exterior body 509 is filled with the electrolytic solution 508.

In the laminated storage battery 500 illustrated in FIG. 4, the positive electrode current collector 501 and the negative electrode current collector 504 also function as terminals for electrical contact with an external portion. For this reason, each of the positive electrode current collector 501 and the negative electrode current collector 504 is provided so as to be partly exposed on the outside of the exterior body 509.

As the exterior body 509 in the laminated storage battery 500, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

<Cylindrical Storage Battery>

Figure 5A:
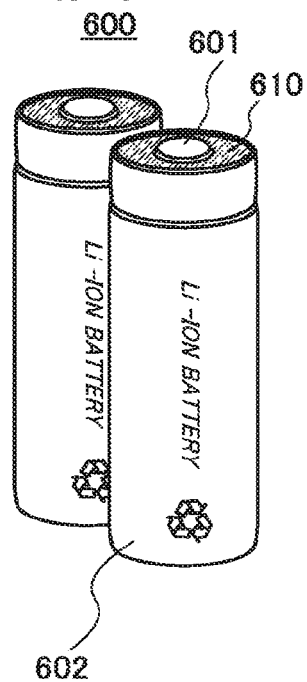
FIGS. 5A and 5B illustrate a cylindrical secondary battery.

Next, an example of a cylindrical storage battery will be described with reference to FIGS. 5A and 5B. As illustrated in FIG. 5A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 5B:
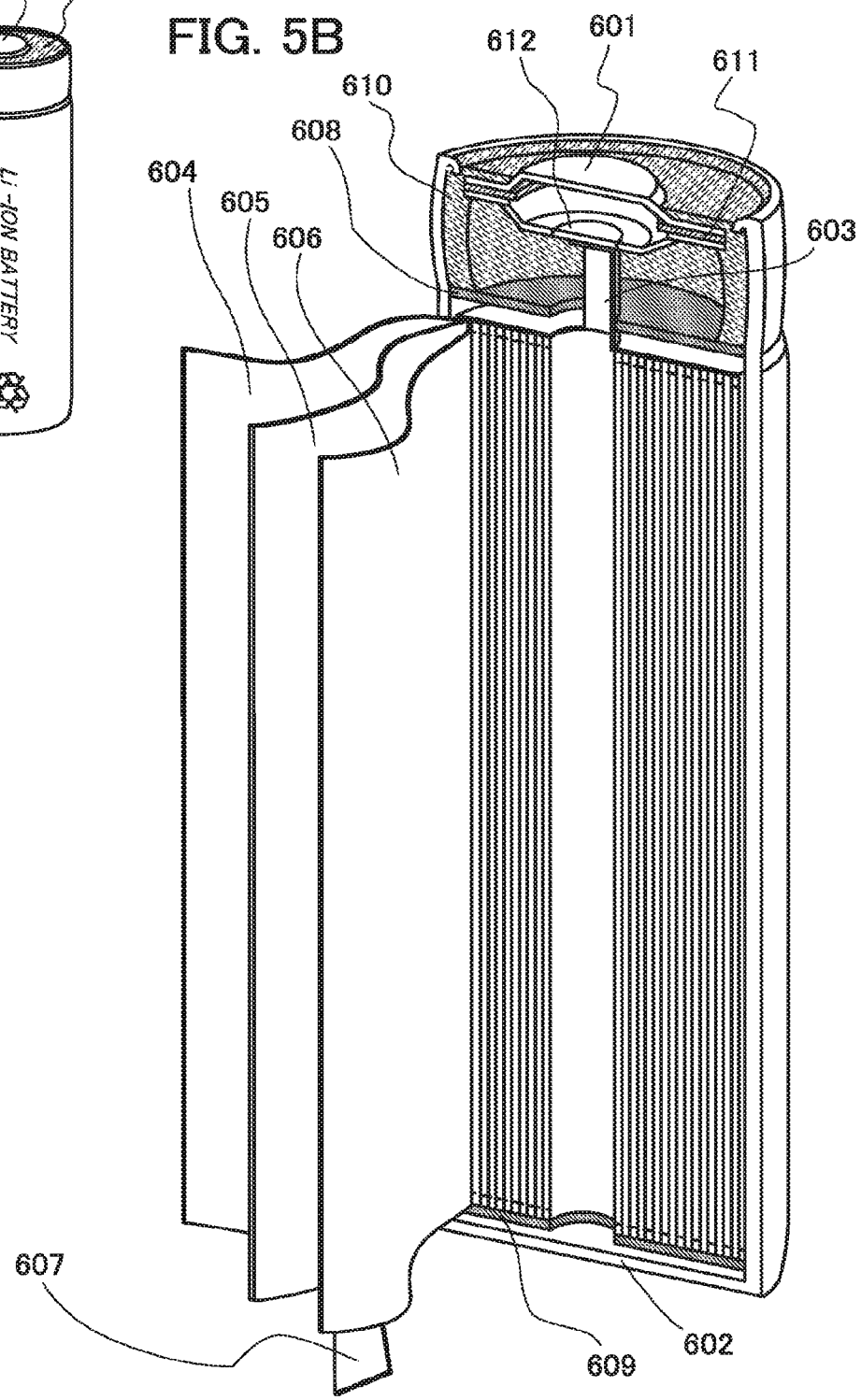

FIG. 5B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to those of the above coin-type storage battery and the laminated power storage device can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Further, a structure in which a plurality of positive electrodes, a plurality of negative electrodes, and a plurality of separators are stacked or wound may be employed.

As the positive electrodes and the negative electrodes of the storage battery 300, the storage battery 500, and the storage battery 600, which are described in this embodiment, electrodes formed by the method for forming a storage battery electrode of one embodiment of the present invention are used. Thus, the discharge capacity of the storage batteries 300, 500, and 600 can be increased.

This embodiment can be implemented in combination with any of the other embodiments as appropriate.

(Embodiment 3)

A storage battery including the storage battery electrode of one embodiment of the present invention can be used for power supplies of a variety of electrical devices driven by power.

Specific examples of electrical devices each utilizing a storage battery including the storage battery electrode of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools such as a chain saw, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the storage batteries are also included in the category of electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electrical devices, the storage battery including the storage battery electrode of one embodiment of the present invention can be used as a main power supply for supplying enough electric power for almost the whole power consumption. Alternatively, in the electrical devices, the storage battery including the storage battery electrode of one embodiment of the present invention can be used as an uninterruptible power supply which can supply electric power to the electrical devices when the supply of electric power from the main power supply or a commercial power supply is stopped. Still alternatively, in the electrical devices, the storage battery including the storage battery electrode of one embodiment of the present invention can be used as an auxiliary power supply for supplying electric power to the electrical devices at the same time as the power supply from the main power supply or a commercial power supply.

FIG. 6 illustrates specific structures of the electrical devices. In FIG. 6, a display device 700 is an example of an electrical device including a storage battery 704 including the storage battery electrode of one embodiment of the present invention. Specifically, the display device 700 corresponds to a display device for TV broadcast reception and includes a housing 701, a display portion 702, speaker portions 703, and the storage battery 704. The storage battery 704 including the storage battery electrode of one embodiment of the present invention is provided in the housing 701. The display device 700 can receive electric power from a commercial power supply. Alternatively, the display device 700 can use electric power stored in the storage battery 704 including the storage battery electrode of one embodiment of the present invention. Thus, the display device 700 can be operated with the use of the storage battery 704 including the storage battery electrode of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 702.

Note that the display device includes, in its category, all of information display devices for personal computers, advertisement displays, and the like besides TV broadcast reception.

In FIG. 6, an installation lighting device 710 is an example of an electrical device including a storage battery 713 including the storage battery electrode of one embodiment of the present invention. Specifically, the lighting device 710 includes a housing 711, a light source 712, and the storage battery 713. Although FIG. 6 illustrates the case where the storage battery 713 is provided in a ceiling 714 on which the housing 711 and the light source 712 are installed, the storage battery 713 may be provided in the housing 711. The lighting device 710 can receive electric power from a commercial power supply. Alternatively, the lighting device 710 can use electric power stored in the storage battery 713. Thus, the lighting device 710 can be operated with the use of storage battery 713 including the storage battery electrode of one embodiment of the present invention as an uninterruptible power supply even when electric power cannot be supplied from a commercial power supply due to power failure or the like.

Note that although the installation lighting device 710 provided in the ceiling 714 is illustrated in FIG. 6 as an example, the storage battery including the storage battery electrode of one embodiment of the present invention can be used in an installation lighting device provided in, for example, a wall 715, a floor 716, a window 717, or the like other than the ceiling 714. Alternatively, the storage battery including the storage battery electrode of one embodiment of the present invention can be used in a tabletop lighting device or the like.

As the light source 712, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 6, an air conditioner including an indoor unit 720 and an outdoor unit 724 is an example of an electrical device including a storage battery 723 including the storage battery electrode of one embodiment of the present invention. Specifically, the indoor unit 720 includes a housing 721, an air outlet 722, and the storage battery 723. Although FIG. 6 illustrates the case where the storage battery 723 is provided in the indoor unit 720, the storage battery 723 may be provided in the outdoor unit 724. Alternatively, the secondary batteries 723 may be provided in both the indoor unit 720 and the outdoor unit 724. The air conditioner can receive electric power from a commercial power supply. Alternatively, the air conditioner can use electric power stored in the storage battery 723. Particularly in the case where the storage batteries 723 are provided in both the indoor unit 720 and the outdoor unit 724, the air conditioner can be operated with the use of the storage battery 723 including the storage battery electrode of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 6 as an example, the storage battery including the storage battery electrode of one embodiment of the present invention can be used in an air conditioner in which the functions of an indoor unit and an outdoor unit are integrated in one housing.

In FIG. 6, an electric refrigerator-freezer 730 is an example of an electrical device including a storage battery 734 including the storage battery electrode of one embodiment of the present invention. Specifically, the electric refrigerator-freezer 730 includes a housing 731, a door for a refrigerator 732, a door for a freezer 733, and the storage battery 734. The storage battery 734 is provided in the housing 731 in FIG. 6. The electric refrigerator-freezer 730 can receive electric power from a commercial power supply. Alternatively, the electric refrigerator-freezer 730 can use electric power stored in the storage battery 734. Thus, the electric refrigerator-freezer 730 can be operated with the use of the storage battery 734 including the storage battery electrode of one embodiment of the present invention as an uninterruptible power supply even when electric power cannot be supplied from a commercial power supply due to power failure or the like.

Note that among the electrical devices described above, a high-frequency heating apparatus such as a microwave oven and an electrical device such as an electric rice cooker require high power in a short time. The tripping of a breaker of a commercial power supply in use of an electrical device can be prevented by using the storage battery including the storage battery electrode of one embodiment of the present invention as an auxiliary power supply for supplying electric power which cannot be supplied enough by a commercial power supply.

In addition, in a time period when electrical devices are not used, particularly when the proportion of the amount of electric power which is actually used to the total amount of electric power which can be supplied from a commercial power supply source (such a proportion referred to as a usage rate of electric power) is low, electric power can be stored in the storage battery, whereby the usage rate of electric power can be reduced in a time period when the electrical devices are used. For example, in the case of the electric refrigerator-freezer 730, electric power can be stored in the storage battery 734 in night time when the temperature is low and the door for a refrigerator 732 and the door for a freezer 733 are not often opened or closed. On the other hand, in daytime when the temperature is high and the door for a refrigerator 732 and the door for a freezer 733 are frequently opened and closed, the storage battery 734 is used as an auxiliary power supply; thus, the usage rate of electric power in daytime can be reduced.

This embodiment can be implemented in combination with any of the other embodiments as appropriate.

(Embodiment 4)

Next, a portable information terminal which is an example of electrical devices will be described with reference to FIGS. 7A to 7C.

Figure 7A:
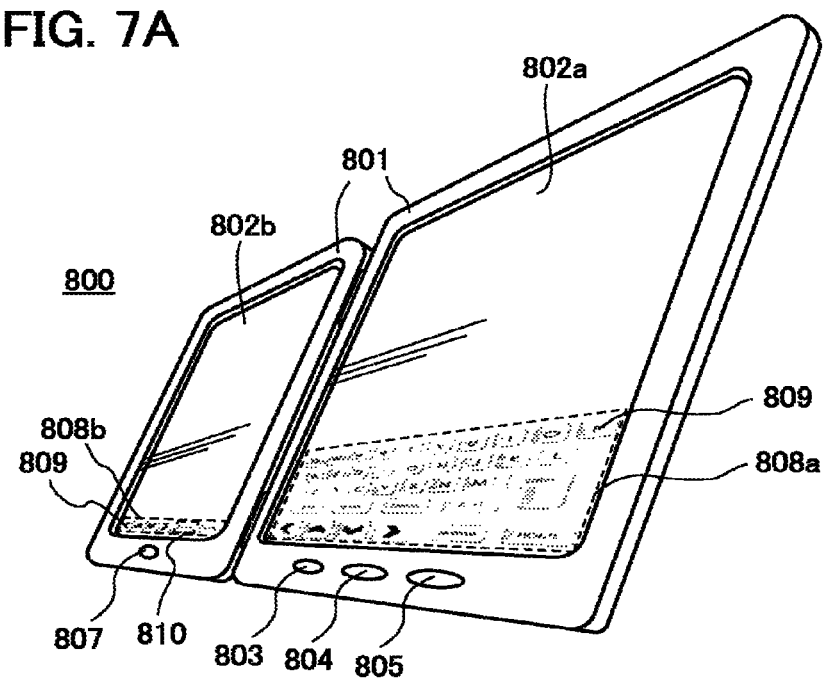
FIGS. 7A to 7C illustrate electronic devices.
Figure 7B:
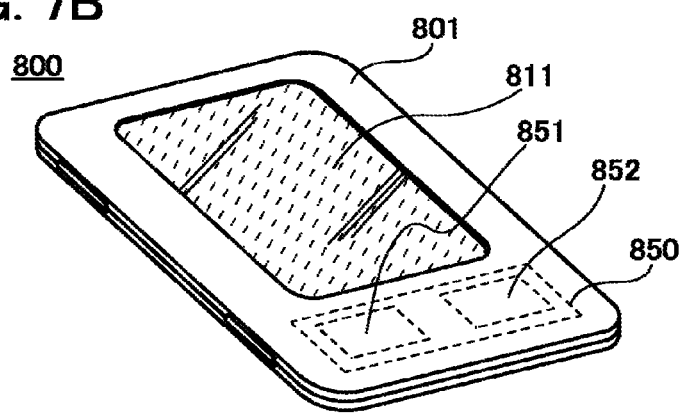

FIGS. 7A and 7B illustrate a tablet terminal 800 which can be folded. FIG. 7A illustrates the tablet terminal 800 in the state of being unfolded. The tablet terminal includes a housing 801, a display portion 802a, a display portion 802b, a display-mode switching button 803, a power button 804, a power-saving-mode switching button 805, and an operation button 807.

A touch panel area 808a can be provided in part of the display portion 802a, in which area, data can be input by touching displayed operation keys 809. Note that half of the display portion 802a has only a display function and the other half has a touch panel function. However, the structure of the display portion 802a is not limited to this, and all the area of the display portion 802a may have a touch panel function. For example, a keyboard can be displayed on the whole display portion 802a to be used as a touch panel, and the display portion 802b can be used as a display screen.

A touch panel area 808b can be provided in part of the display portion 802b like in the display portion 802a. When a keyboard display switching button 810 displayed on the touch panel is touched with a finger, a stylus, or the like, a keyboard can be displayed on the display portion 802b.

The touch panel area 808a and the touch panel area 808b can be controlled by touch input at the same time.

The display-mode switching button 803 allows switching between a landscape mode and a portrait mode, color display and black-and-white display, and the like. The power-saving-mode switching button 805 allows optimizing the display luminance in accordance with the amount of external light in use which is detected by an optical sensor incorporated in the tablet terminal. In addition to the optical sensor, other detecting devices such as sensors for determining inclination, such as a gyroscope or an acceleration sensor, may be incorporated in the tablet terminal.

Although the display area of the display portion 802a is the same as that of the display portion 802b in FIG. 7A, one embodiment of the present invention is not particularly limited thereto. The display area of the display portion 802a may be different from that of the display portion 802b, and further, the display quality of the display portion 802a may be different from that of the display portion 802b. For example, one of the display portions 802a and 802b may display higher definition images than the other.

FIG. 7B illustrates the tablet terminal 800 in the state of being closed. The tablet terminal 800 includes the housing 801, a solar cell 811, a charge/discharge control circuit 850, a battery 851, and a DC-DC converter 852. FIG. 7B illustrates an example where the charge/discharge control circuit 850 includes the battery 851 and the DC-DC converter 852. The storage battery including the storage battery electrode of one embodiment of the present invention, which is described in the above embodiment, is used as the battery 851.

Since the tablet terminal can be folded, the housing 801 can be closed when the tablet terminal is not in use. Thus, the display portions 802a and 802b can be protected, which permits the tablet terminal 800 to have high durability and improved reliability for long-term use.

The tablet terminal illustrated in FIGS. 7A and 7B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 811, which is attached on a surface of the tablet terminal, can supply electric power to a touch panel, a display portion, an image signal processor, and the like. Note that the solar cell 811 can be provided on one or both surfaces of the housing 801 and thus the battery 851 can be charged efficiently.

The structure and operation of the charge/discharge control circuit 850 illustrated in FIG. 7B will be described with reference to a block diagram of FIG. 7C. FIG. 7C illustrates the solar cell 811, the battery 851, the DC-DC converter 852, a converter 853, switches SW1 to SW3, and the display portion 802. The battery 851, the DC-DC converter 852, the converter 853, and the switches SW1 to SW3 correspond to the charge and discharge control circuit 850 in FIG. 7B.

First, an example of operation in the case where electric power is generated by the solar cell 811 using external light will be described. The voltage of electric power generated by the solar cell is raised or lowered by the DC-DC converter 852 so that the electric power has a voltage for charging the battery 851. When the display portion 802 is operated with the electric power from the solar cell 811, the switch SW1 is turned on and the voltage of the electric power is raised or lowered by the converter 853 to a voltage needed for operating the display portion 802. In addition, when display on the display portion 802 is not performed, the switch SW1 is turned off and the switch SW2 is turned on so that the battery 851 may be charged.

Although the solar cell 811 is described as an example of a power generation means, there is no particular limitation on the power generation means, and the battery 851 may be charged with any of the other means such as a piezoelectric element or a thermoelectric conversion element (Peltier element). For example, the battery 851 may be charged with a non-contact power transmission module capable of performing charging by transmitting and receiving electric power wirelessly (without contact), or any of the other charge means used in combination.

Figure 7C:
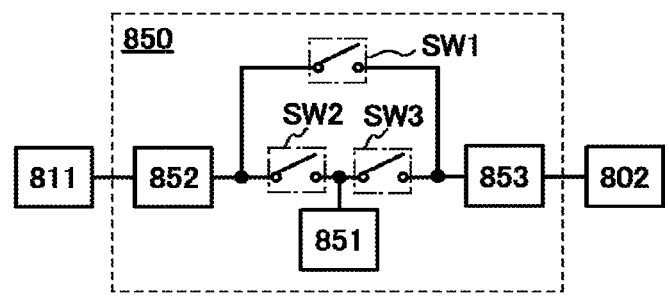

It is needless to say that one embodiment of the present invention is not limited to the electrical device illustrated in FIGS. 7A to 7C as long as the electrical device is equipped with the storage battery including the storage battery electrode of one embodiment of the present invention, which is described in the above embodiment.

(Embodiment 5)

Further, an example of the moving object which is an example of the electrical devices will be described with reference to FIGS. 8A and 8B.

The storage battery described in the above embodiment can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 8A:
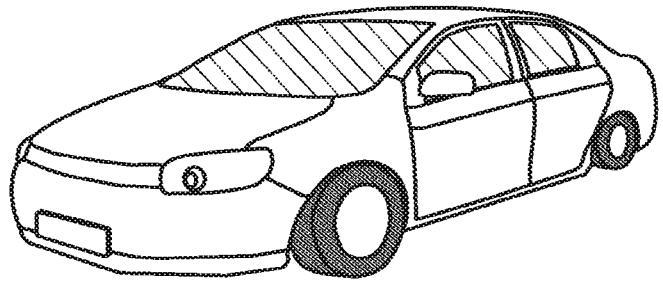
FIGS. 8A and 8B illustrate an electronic device.
Figure 8B:
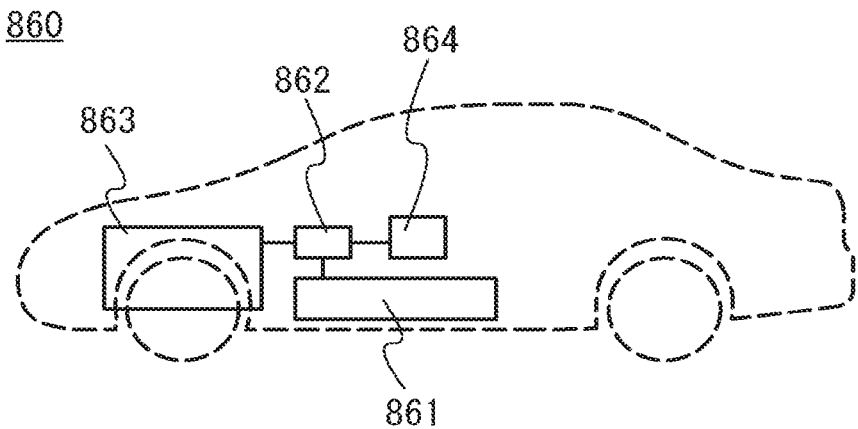

FIGS. 8A and 8B illustrate an example of an electric vehicle. An electric vehicle 860 is equipped with a battery 861. The output of the electric power of the battery 861 is adjusted by a control circuit 862 and the electric power is supplied to a driving device 863. The control circuit 862 is controlled by a processing unit 864 including a ROM, a RAM, a CPU, or the like which is not illustrated.

The driving device 863 includes a DC motor or an AC motor either alone or in combination with an internal-combustion engine. The processing unit 864 outputs a control signal to the control circuit 862 based on input data such as data on operation (e.g., acceleration, deceleration, or stop) of a driver or data during driving (e.g., data on an upgrade or a downgrade, or data on a load on a driving wheel) of the electric vehicle 860. The control circuit 862 adjusts the electric energy supplied from the battery 861 in accordance with the control signal of the processing unit 864 to control the output of the driving device 863. In the case where the AC motor is mounted, although not illustrated, an inverter which converts direct current into alternate current is also incorporated.

The battery 861 can be charged by external electric power supply using a plug-in technique. For example, the battery 861 is charged through a power plug from a commercial power supply. The battery 861 can be charged by converting the supplied power into DC constant voltage having a predetermined voltage level through a converter such as an AC-DC converter. The use of the storage battery including the storage battery electrode of one embodiment of the present invention as the battery 861 can be conducive to an increase in battery capacity, leading to an improvement in convenience. When the battery 861 itself can be more compact and more lightweight as a result of improved characteristics of the battery 861, the vehicle can be lightweight, leading to an increase in fuel efficiency.

Note that it is needless to say that one embodiment of the present invention is not limited to the electrical device described above as long as the storage battery of one embodiment of the present invention is included.

This embodiment can be implemented in combination with any of the other embodiments as appropriate.

EXAMPLE 1

The present invention will be described in detail below with examples. Note that the present invention is not limited to the following examples.

(Formation of Graphene Oxide Dispersion)

A dispersion containing graphene oxide (hereinafter referred to as a graphene oxide dispersion) was formed by the following method. First, 4 g of graphite (BF-40AK manufactured by Chuetsu Graphite Works Co., Ltd.) and 138 mL of concentrated sulfuric acid were mixed to form a mixed solution. Then, 18 g of potassium permanganate was added to the mixed solution while they were stirred in an ice bath. After the ice bath was removed and stirring was performed at room temperature for 2 hours, the resulting solution was reacted at 35° C. for 30 minutes, so that a mixed solution A containing graphite oxide was formed.

Figure 12:
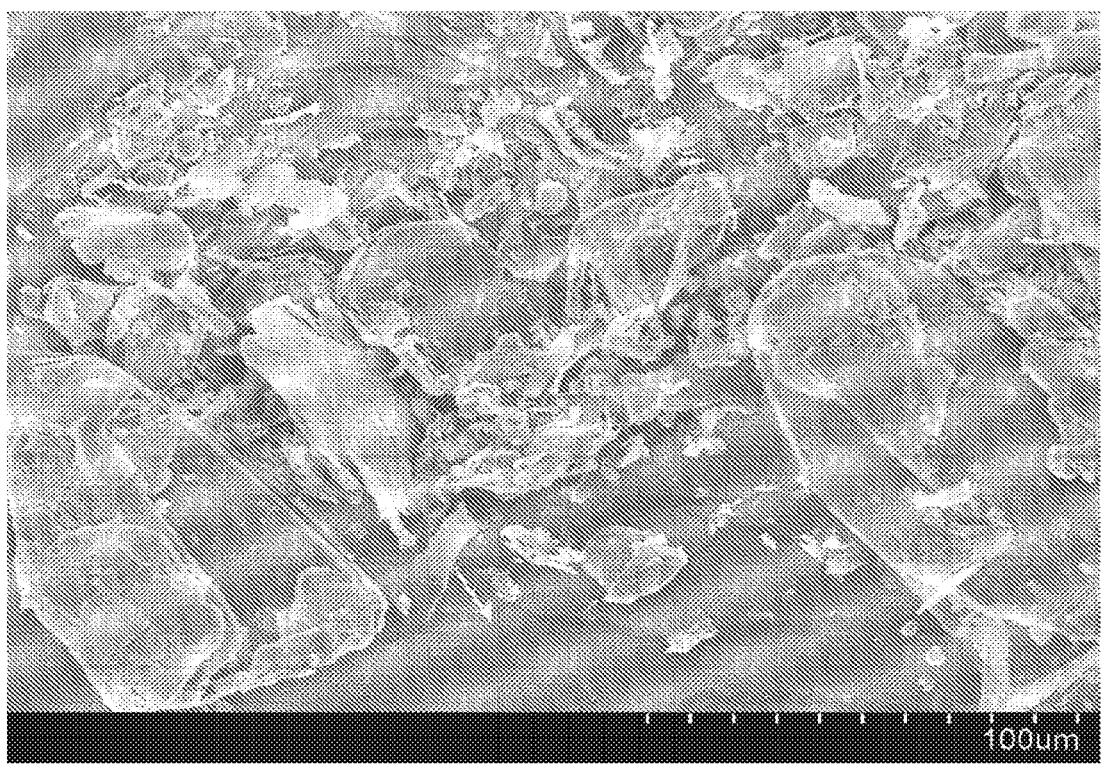
FIG. 12 is a SEM image of a surface of graphite.

FIG. 12 shows a SEM image of a surface of graphite used here.

Next, 276 mL of water was added to the mixed solution A containing graphite oxide while they were stirred in an ice bath. After the resulting mixed solution was stirred in an oil bath at about 95° C. for 15 minutes so that reaction was caused, 400 mL of water and 54 mL of hydrogen peroxide solution (with a concentration of 30%) were added to the mixed solution while they were stirred, in order to deactivate unreacted potassium permanganate. Consequently, a mixed solution B was formed.

Next, suction filtration of the mixed solution B was carried out using a membrane filter with a pore size of 0.45 μm to form a precipitate. After that, a mixed solution which was formed by adding a 3.5% hydrochloric acid to the precipitate and then stirring the mixture was subjected to suction filtration, so that a precipitate containing the graphite oxide was formed.

The precipitate containing the graphite oxide was mixed with 4 L of water and ultrasonic waves with a frequency of 40 kHz were applied to the obtained mixed solution for one hour, so that a graphene oxide dispersion was formed. Next, centrifugation was carried out at 9000 rpm to collect precipitated graphene oxide.

A mixed solution C formed by adding 2 L of pure water per about 2.5 g of the graphene oxide was centrifugated at 9000 rpm plural times, and the graphene oxide was washed.

Pure water was added to the graphene oxide again to form a graphene oxide dispersion.

EXAMPLE 2

(Production of Compound)

A compound obtained by drying the graphene oxide dispersion formed by the method described in Example 1 is referred to as Comparative Sample 1.

L-ascorbic acid was added as a reducer to the compound to prepare a graphene oxide dispersion containing about 0.27 g/L graphene oxide and 13.5 g/L ascorbic acid. The obtained mixture left in a dark place at room temperature for 3 hours was centrifugated to obtain a precipitate, and the precipitate was dried at room temperature in vacuum to produce a compound. This compound is referred to as Sample 1.

The compound was irradiated with light from a high pressure mercury lamp for 3 hours while it was bubbled with $N_2$ in a water bath. The water temperature after the light irradiation was 50° C. The reacted graphene oxide aggregated to form a lump, and the liquid was clear. The lump was washed with pure water and a precipitate obtained by centrifugation or filtration was dried at room temperature in vacuum to produce a compound. This compound is referred to as Sample 2.

Similarly, the compound obtained as Comparative Sample 1 to which L-ascorbic acid was not added was irradiated with light from a high pressure mercury lamp for 3 hours, the mixture was washed with pure water and then centrifugated to obtain a precipitate, and the precipitate was dried at room temperature in vacuum to produce a compound. This compound is referred to as Comparative Sample 2.

Further, L-ascorbic acid was added as a reducer to the graphene oxide dispersion formed by the method described in Example 1 to prepare a graphene oxide dispersion containing about 0.27 g/L graphene oxide and 13.5 g/L ascorbic acid. The graphene oxide dispersion was reacted in a hot-water bath at 80° C. in a dark place for 8 hours. The reacted graphene oxide aggregated to form a lump, and the liquid was clear. The lump was washed with pure water, centrifugation or filtration was performed, and a precipitate was dried at room temperature in vacuum to produce a compound. This compound is referred to as Sample 3.

An ethanol solution containing 13.5 g/L ascorbic acid and dispersed 0.27 g/L graphene oxide was reacted in a hot-water bath at 60° C. for 4.5 hours. Consequently, the reacted graphene oxide aggregated to form a lump, and the liquid was clear.

Here, ascorbic acid was used as the reducer of the graphene oxide. The redox reaction of the ascorbic acid can be expressed by Equation (A-1).

[Chemical Formula 1]

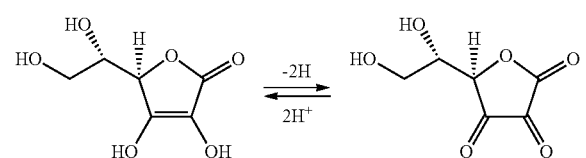

(A-1)

Similarly, the compound obtained as Comparative Sample 1 to which L-ascorbic acid was not added was reacted in a hot-water bath at 80° C. for 8 hours, washing was performed with pure water, centrifugation was performed to obtain a precipitate, and the precipitate was dried at room temperature in vacuum to produce a compound. This compound is referred to as Comparative Sample 3.

Further, graphene oxide is synthesized by a Modified Hummers method, dried, and pulverized. Then, baking is performed at 300° C. in vacuum for 10 hours to obtain a compound. This compound is referred to as Comparative Sample 4.

(XPS Analysis)

Evaluation of the compositions and evaluation of the carbon binding states based on the chemical shift amount of a 1s orbital of a carbon atom of Samples 1 to 3 and Comparative Samples 1 to 4 prepared in the above manner were carried out by X-ray Photoelectron Spectroscopy (XPS). For XPS, QuanteraSXM manufactured by ULVAC-PHI, INCORPORATED having a monochromatic Al X-ray source (1486.6 eV) was used. Table 1 and Table 2 show analysis results.

TABLE 1

| Sample | C | O | S | Others | C/O |
|---|---|---|---|---|---|
| Comparative Sample 1 | 65.0 | 33.7 | 1.2 | 0.2 | 1.93 |
| Sample 1 | 69.5 | 29.8 | 0.4 | 0.3 | 2.33 |
| Sample 2 | 84.9 | 15.1 | <0.1 | — | 5.62 |
| Comparative Sample 2 | 68.5 | 31.2 | 0.3 | — | 2.20 |
| Sample 3 | 86.6 | 13.2 | — | 0.2 | 6.56 |
| Comparative Sample 3 | 68.5 | 31.0 | 0.3 | 0.2 | 2.21 |
| Comparative Sample 4 | 87.1 | 12.9 | — | — | 6.75 |

Unit: atomic %

TABLE 2

| Sample | C=C | C—C C—H | C—O | C=O | O=C—O |
|---|---|---|---|---|---|
| Comparative Sample 1 | — | 35.9 | 48.4 | 11.6 | 4.1 |
| Sample 1 | — | 51.2 | 36.9 | 8.6 | 3.3 |
| Sample 2 | 65.7 | 12.9 | 15.5 | 3.1 | 2.8 |
| Comparative Sample 2 | — | 47.9 | 41.2 | 6.6 | 4.2 |
| Sample 3 | 69.8 | 11.9 | 12.5 | 2.8 | 3.0 |
| Comparative Sample 3 | — | 50.3 | 42.0 | 4.6 | 3.0 |
| Comparative Sample 4 | 47.0 | 32.4 | 11.9 | 4.3 | 4.3 |

Unit: atomic %

Table 1 shows XPS analysis results of the compositions of the samples. The proportions (at. %) of carbon (C), oxygen (O), sulfur (S), and the other elements of the samples are shown. In the rightmost columns, the atomic ratios of carbon atoms to oxygen atoms (C/O) are shown. Sample 1 has a greater C/O than Comparative Sample 1 not subjected to reduction treatment, which suggests the reduction reaction of Sample 1.

On the other hand, as shown in Table 1, Sample 2 and Sample 3 have significantly high C/O of 5.62 and 6.56, respectively. Also in the atomic ratio in the C1s binding state shown in Table 2, a high proportion of C(sp2)=C(sp2) bonds are observed. Further, the proportion of sulfur (S) in Sample 2 was less than 0.1 and sulfur in Sample 3 was not able to be detected, which implies that the sulfur was released from the graphene oxide.

Comparison of Sample 2 and Sample 3 with Comparative Sample 4 formed by thermal reduction shows that the samples have similar compositions in Table 1. This suggests that when the formation method of one embodiment of the present invention is employed, graphene oxide can be reduced even at a sufficiently low temperature as in the case where heat treatment is performed.

EXAMPLE 3

In this example, the characteristics of a storage battery formed by the method for forming a storage battery electrode of one embodiment of the present invention are compared with the characteristics of a storage battery formed without employing the method of the present invention.
(Fabrication of Storage Battery)

A method for forming Electrode A will be described. First, NMP was added as a solvent to $LiFePO_4$ to which graphene oxide was added and the mixture was kneaded until it had the consistency of thick paste. After an NMP solution of PVDF (No. 7300 manufactured by KUREHA CORPORATION) was added as a binder solution to the mixture of graphene oxide and $LiFePO_4$, NMP was further added as a polar solvent and mixing was performed to form slurry. Finally, the ratio of $LiFePO_4$:graphene oxide:PVDF in the slurry was 93 wt %:2 wt %:5 wt %. The slurry formed by the above method was applied to a current collector and dried at 80° C. in the air for 40 minutes, so that Electrode A where an active material layer was formed over the current collector was formed. The current collector was formed in such a manner that aluminum with a thickness of 20 μm was coated with a mixture of graphite and sodium polyacrylate (90 wt %:10 wt %) to a thickness of about 1 μm with a doctor blade and drying was eventually performed at 170° C. in vacuum. The active material content was about 7 mg/cm².

The graphene oxide was reduced while Electrode A was dried at 170° C. in vacuum for 10 hours. After that, resulting Electrode A was pressed and stamped into a circular shape with a diameter of 12 mm. A 2032-type coin battery including this electrode as a positive electrode is referred to as Comparative Battery B. In Comparative Battery B, polypropylene (PP) was used as a separator; a lithium metal was used as a negative electrode; and an electrolytic solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1 was used. Note that the active material content in the positive electrode was about 6 mg/cm² to 7 mg/cm².

Further, Electrode A was immersed in an ethanol solution containing 13.5 g/L L-ascorbic acid and they were reacted with each other in a hot-water bath at 60° C. for 4.5 hours, so that the graphene oxide was reduced. That is to say, the graphene oxide was reduced by chemical reduction. Then, the resulting electrode was immersed in ethanol to be washed. Then, the electrode was dried at 100° C. in vacuum for 10 hours, followed by pressing of it. After that, stamping was performed to form a circular shape with a diameter of 12 mm. The obtained electrode was used as a positive electrode to fabricate a 2032-type coin battery; this battery is referred to as Battery A. Materials of components except the positive electrode in Battery A were the same as those in Comparative Battery B. Note that the active material content in the positive electrode was about 6 mg/cm² to 7 mg/cm².

Further, for comparison, a battery was fabricated using acetylene black (AB), which is a conventional conductive additive, instead of graphene obtained by reducing graphene oxide. As acetylene black (AB), a powdery product of DENKI KAGAKU KOGYO KABUSHIKI KAISHA was used. The specific surface area was 68 m²/g and the average particle diameter was 35 nm. The compounding ratio ($LiFePO_4$:conductive additive (AB):PVDF) in the positive electrode active material layer was set to 80:15:5. In a manner similar to that of the above battery, this positive electrode active material layer was formed over an Al current collector to form an electrode and this electrode is used to fabricate Comparative Battery C.
(Characteristics of Storage Batteries and Comparison of Reduction Treatment of Graphene Oxides)

Figure 9:
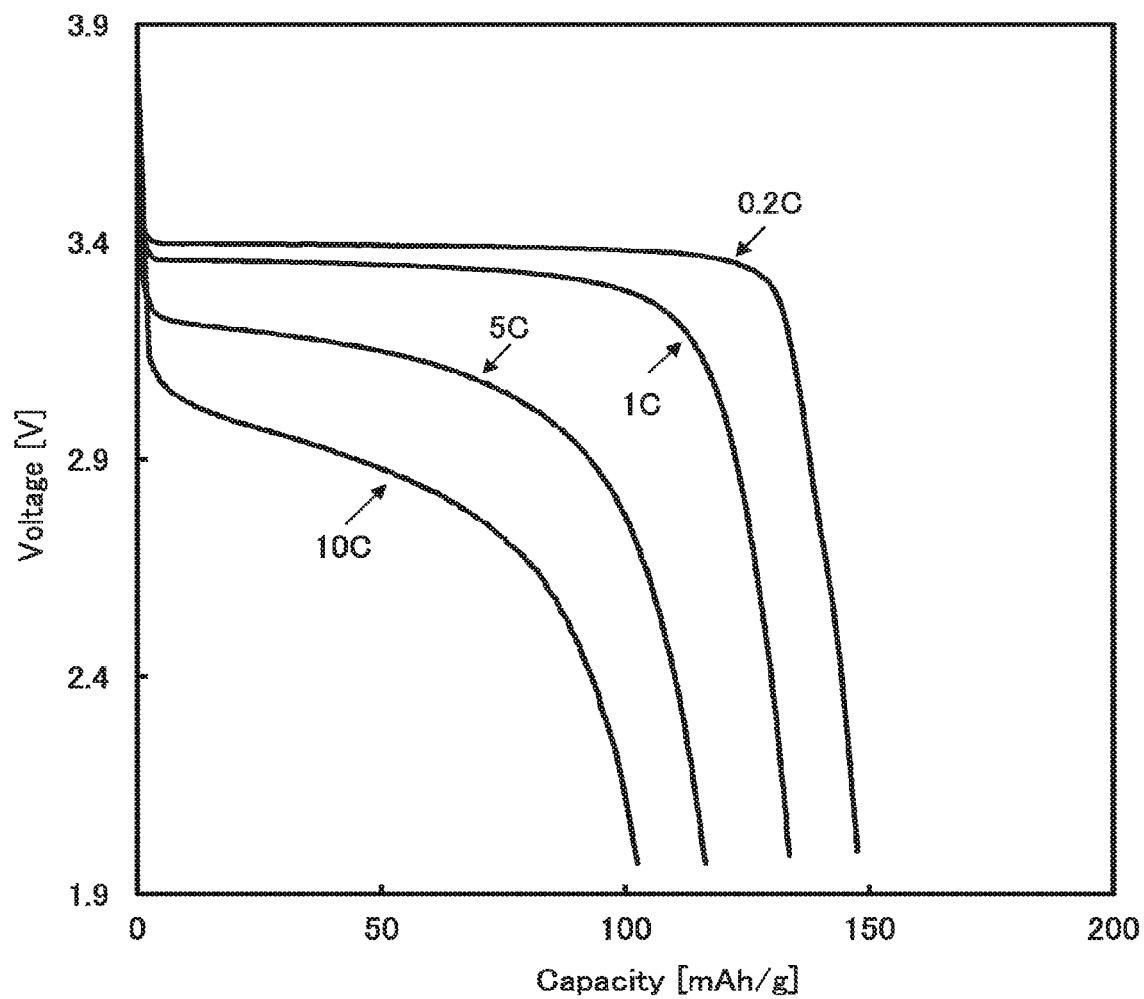
FIG. 9 shows the discharge characteristics of a battery A.
Figure 10:
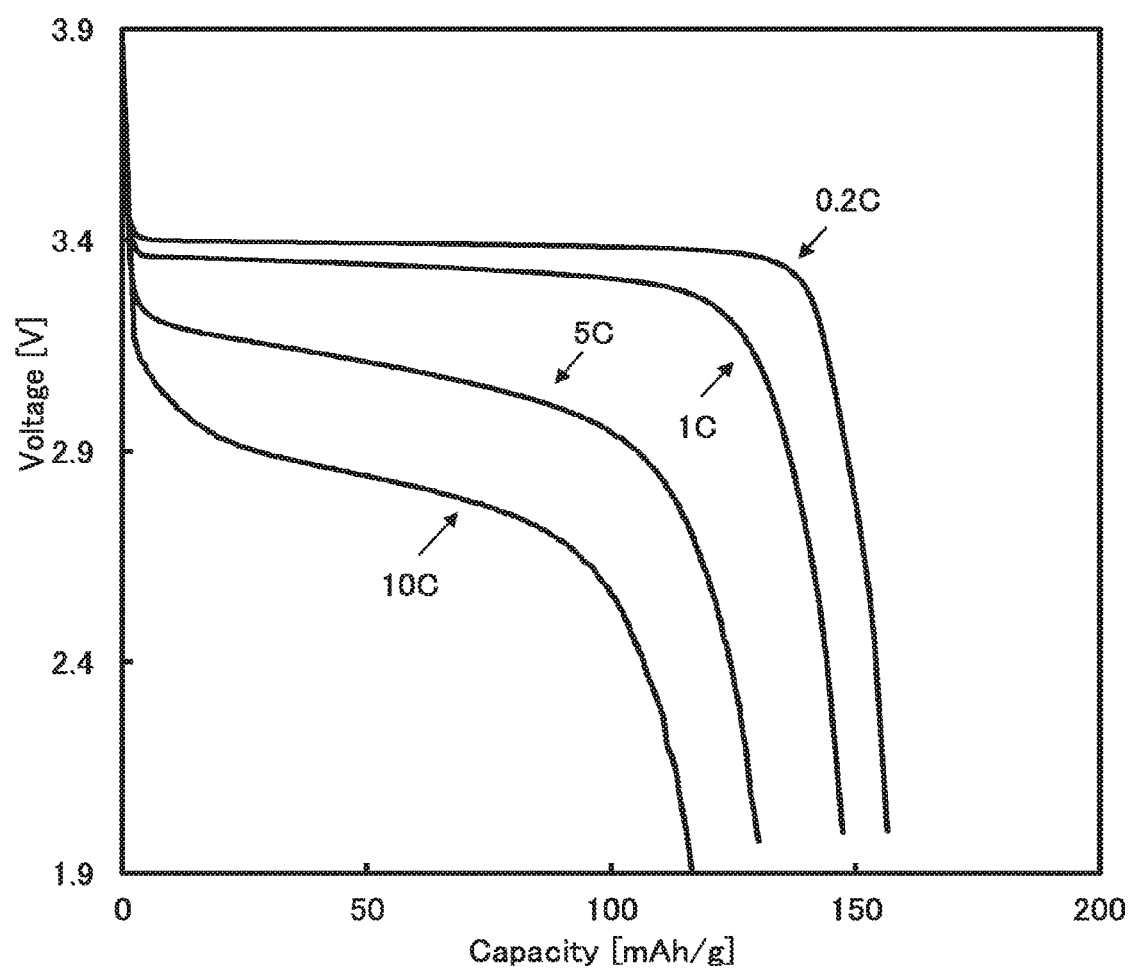
FIG. 10 shows the discharge characteristics of a comparative battery B.
Figure 11:
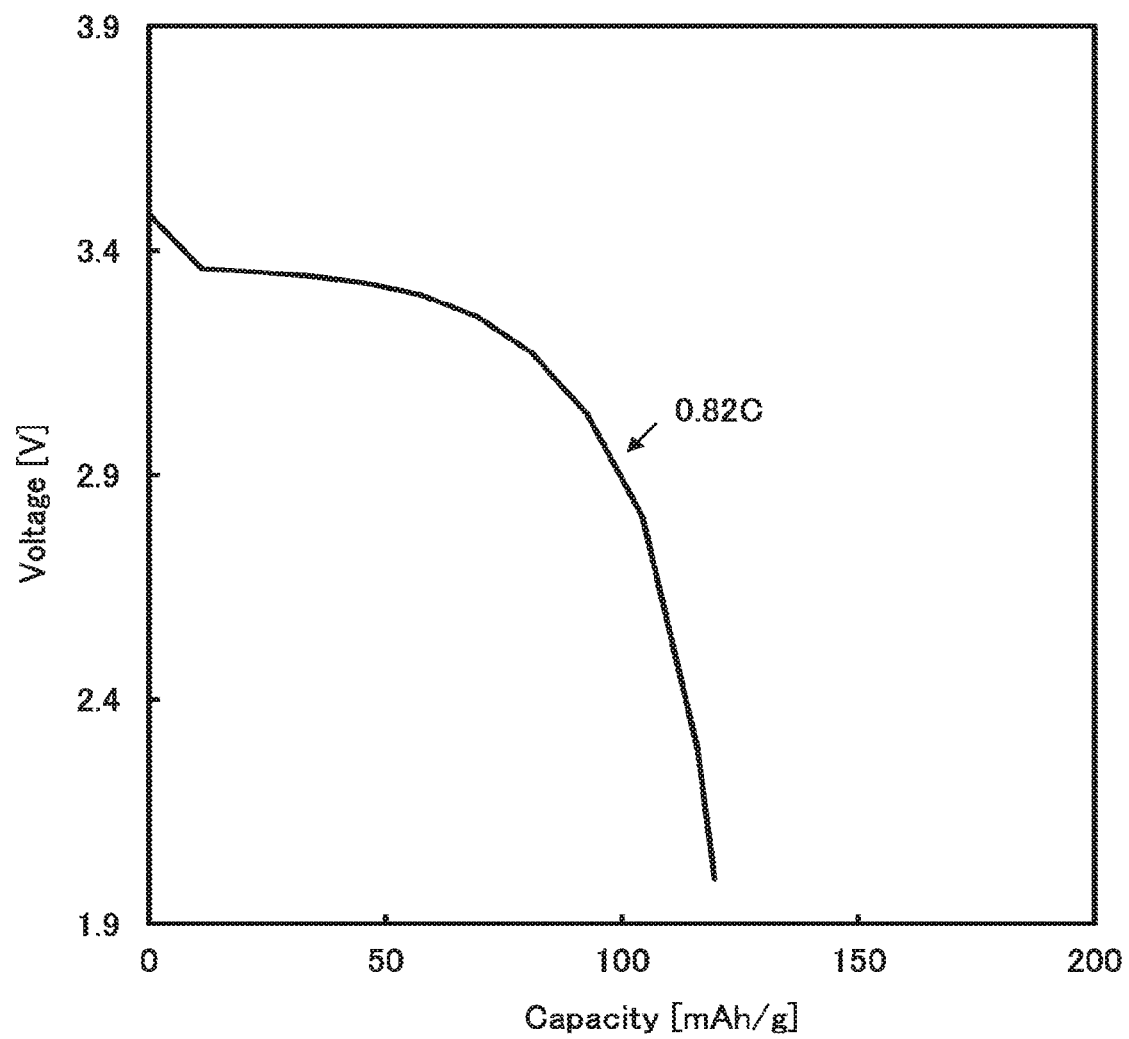
FIG. 11 shows the discharge characteristics of a comparative battery C.

FIGS. 9 to 11 show measurement results of the constant current discharge characteristics of Battery A, Comparative Battery B, and Comparative Battery C.

FIG. 10 is a graph showing the discharge characteristics of Comparative Battery B, where the horizontal axis represents discharge capacity (mAh/g) and the vertical axis represents voltage (V). As for Comparative Battery B, graphene oxide used as a raw material of a conductive additive in a positive electrode was thermally reduced by heat treatment at 170° C. for 10 hours.

FIG. 10 shows three discharge curves of different discharge rates. A charge and discharge rate C refers to the rate at which a battery is charged and discharged and is represented by "current (A)÷capacity (Ah)". For example, the charge and discharge rate in the case of charging and discharging a battery having a capacity of 1 Ah with 1 A is 1 C, and the charge and discharge rate in the case of charging and discharging the battery with 10 A is 10 C. The discharge rates for the measurement were 0.2 C (5 hours are needed to completely discharge the battery), 1 C, and 10 C. Particularly in the case where the discharge rate was 0.2 C, the plateau potential was about 3.4 V, that was high, and the plateau was maintained until when the discharge capacity exceeded 100 mAh/g. Further, a high discharge capacity of about 150 mAh/g was observed.

On the other hand, FIG. 9 shows the discharge characteristics of Battery A including the storage battery electrode formed by the formation method of one embodiment of the present invention. The horizontal axis represents discharge capacity (mAh/g) and the vertical axis represents voltage (V). As in the case of Comparative Battery B, measurement was carried out under the conditions that the discharge rates were 0.2 C (5 hours are needed to completely discharge the battery), 1 C, and 10 C.

As shown in FIG. 9, in the case where the discharge rate was 0.2 C, the plateau potential was about 3.4 V, which was high, and was maintained until when the discharge capacity exceeded 100 mAh/g. Further, a high discharge capacity of about 150 mAh/g was observed. This result is very close to that of Comparative Battery B, and the results obtained in the cases where the discharge rates were 1 C and 10 C were also very close to those of Comparative Battery B.

Thus, although the discharge capacity of Battery A was slightly less than that of Comparative Battery B, Battery A, which was obtained using chemical reduction treatment, was able to have battery characteristics substantially the same as those of Comparative Battery B, which was obtained using thermal reduction treatment. That is to say, the electrode in Comparative Battery B needed to be subjected to thermal treatment at no less than 170° C., whereas the electrode in Battery A which was of equal quality to that in Comparative Battery B was able to be formed at lower than 170° C.

In formation of the storage battery electrode used for Battery A, L-ascorbic acid was used as a reducer. L-ascorbic acid has lower reducing ability and lower toxicity than a reducer such as hydrazine and thus is highly safe for formation of a storage battery electrode. The above results show that even when L-ascorbic acid with not high reducing ability is used as a reducer, the battery having characteristics similar to those of Comparative Battery B, which is obtained using thermal reduction treatment, was able to be fabricated.

FIG. 11 is a graph showing the discharge characteristics of Comparative Battery C, where the horizontal axis represents discharge capacity (mAh/g) and the vertical axis represents voltage (V). Measurement was carried out under the condition that the discharge rate was 0.82 C. The discharge curve of Comparative Battery C containing acetylene black as a conductive additive does not have a plateau discharge region and the discharge capacity of Comparative battery C is small.

The above results show that the storage battery including the storage battery electrode formed by the method for forming a storage battery electrode of one embodiment of the present invention had much more favorable characteristics than the storage battery including the conventional conductive additive.

In other words, by the method for forming a storage battery electrode of one embodiment of the present invention, the storage battery electrode including the active material layer with high density in which the proportion of conductive additive is low and the proportion of the active material was high was able to be formed.

Further, graphene oxide was able to be reduced at a reaction temperature sufficiently lower than that in the case of reducing graphene oxide by heat treatment.

Further, a reducer which has weaker toxicity, e.g., ascorbic acid was able to be used instead of a highly toxic reducer such as hydrazine.

EXAMPLE 4

In this example, the characteristics of a storage battery formed by the method for forming a storage battery electrode of one embodiment of the present invention are compared with the characteristics of a storage battery formed without employing the method of the present invention. Note that in this example, unlike in the case of Battery A described in Example 3, an electrode was immersed in an aqueous solution containing ascorbic acid instead of being immersed in an ethanol solution containing ascorbic acid so that graphene oxide was reduced.

(Fabrication of Storage Battery)

Electrode A obtained in Example 3 was immersed in a reducing solution prepared by dissolving 77 mM ascorbic acid and 73 mM lithium hydroxide in ultrapure water and reaction was caused in a hot-water bath at 60° C. for 30 minutes, so that the graphene oxide was reduced. That is to say, the graphene oxide was reduced by chemical reduction. The resulting electrode was immersed in ethanol to be washed. Then, the electrode was dried at 100° C. in vacuum for 10 hours, followed by re-pressing of it. After that, stamping was performed to form a circular shape with a diameter of 12 mm. The obtained electrode was used as a positive electrode to fabricate a 2032-type coin battery; this battery is referred to as Battery D. Materials of components except the positive electrode in Battery D were the same as those in Comparative Battery B.

(Comparison of Characteristics and Discharge Rates of Storage Batteries)

Figure 13A:
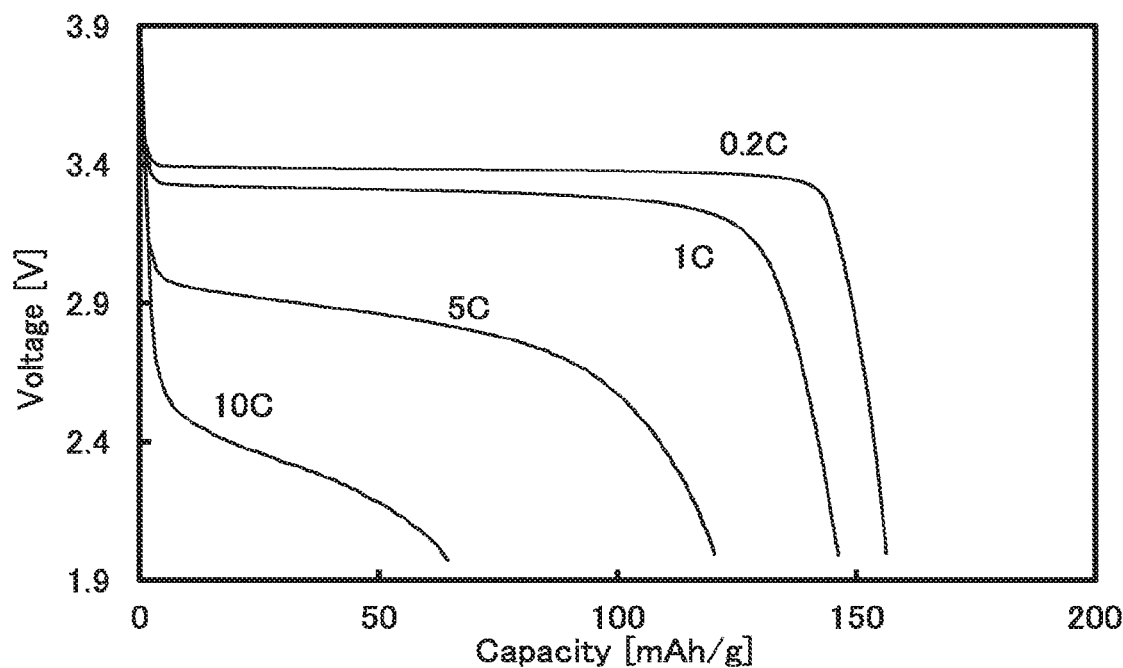
FIG. 13A shows the discharge characteristics of the battery D.

FIG. 13A shows measurement results of the constant current discharge characteristics of Battery D. The horizontal axis represents discharge capacity (mAh/g) and the vertical axis represents voltage (V). As in the case of Comparative Battery B, measurement was carried out under the conditions that the discharge rates were 0.2 C (5 hours are needed to completely discharge the battery), 1 C, 5 C, and 10 C.

As shown in FIG. 13A, in the case where the discharge rate was 0.2 C, the plateau potential was about 3.4 V, which was high, and was maintained until when the discharge capacity exceeded 100 mAh/g. Further, a high discharge capacity of about 150 mAh/g was observed.

(Comparison 1 of Characteristics and Reduction Treatment of Graphene Oxides of Storage Batteries)

Figure 13B:
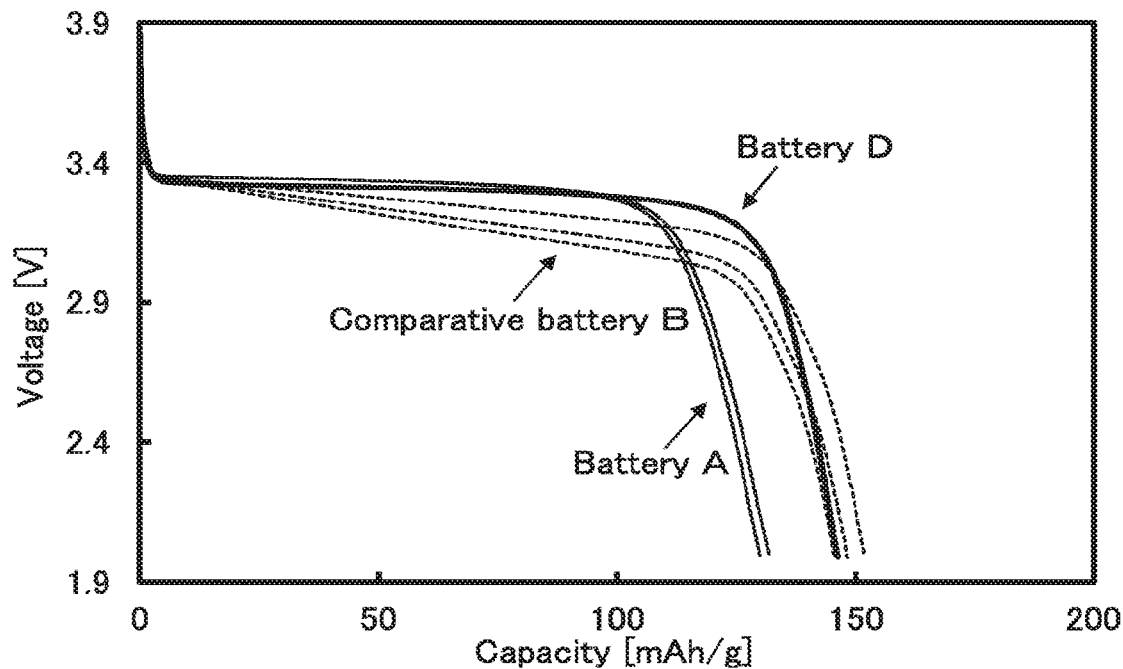
FIG. 13B shows the discharge characteristics of the battery A, the comparative battery B, and a battery D.

FIG. 13B shows the electric characteristics of Battery A and Comparative Battery B described in Example 3 and Battery D described in this example. The horizontal axis represents discharge capacity (mAh/g) and the vertical axis represents voltage (V). Measurement was carried out under the condition that the discharge rate was 1 C. In FIG. 13B, a thick solid line shows the electric characteristics of Battery D, thin solid lines show the electric characteristics of Battery A, and dashed lines show the electric characteristics of Comparative Battery B. The measurement of the electric characteristics was carried out using one sample of Battery D, two samples of Battery A, and three samples of Comparative Battery B.

As shown in FIG. 13B, like Battery A, the curve of Battery D has a high plateau potential of about 3.4 V and the plateau was maintained until when the discharge capacity exceeded 100 mAh/g. Further, the discharge capacity of Battery D was as high as about 150 mAh/g as in the case of Comparative Battery B.

Thus, having discharge capacity equal to or substantially equal to that of Comparative Battery B, which was obtained using thermal reduction treatment, and small variations in plateau potential, Battery D, which was obtained using chemical reduction treatment, was able to have battery characteristics more excellent than those of Comparative Battery B. That is to say, the electrode in Comparative Battery B needed to be subjected to thermal treatment at no less than 170° C., whereas the electrode in Battery D which was of equal quality to that in Comparative Battery B was able to be formed at lower than 170° C. Further, it was found that it was possible to use an organic solvent and water as solvents of L-ascorbic acid serving as a reducer.

(Comparison 2 of Characteristics and Reduction Treatment of Graphene Oxides of Storage Batteries)

Figure 14:
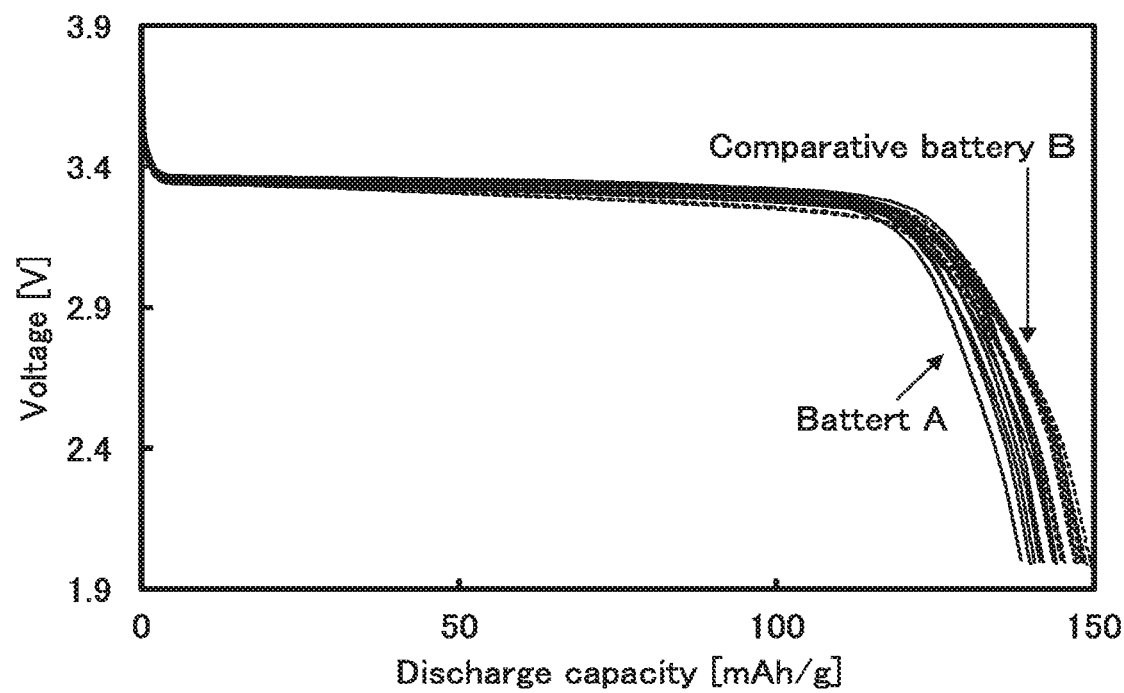
FIG. 14 shows the discharge characteristics of the battery A and the comparative battery B.

FIG. 14 shows measurement results of the electric characteristics of a plurality of samples of Battery A and Comparative Battery B. Note that a current collector in a positive electrode of Battery A was formed in such a manner that aluminum with a thickness of 20 μm was coated with an about 1-μm-thick mixture of graphite and sodium polyacrylate (90 wt %:10 wt %) by a gravure method and drying was performed at 80° C. in the air. The active material content in the positive electrode was about 7 mg/cm².

The horizontal axis represents discharge capacity (mAh/g) and the vertical axis represents voltage (V). Measurement was carried out under the condition that the discharge rate was 1 C. In FIG. 14, solid lines show the electric characteristics of Battery A, and dashed lines show the electric characteristics of Comparative Battery B. The measurement of the electric characteristics was carried out using six samples of Battery A and six samples of Comparative Battery B.

Figure 15A:
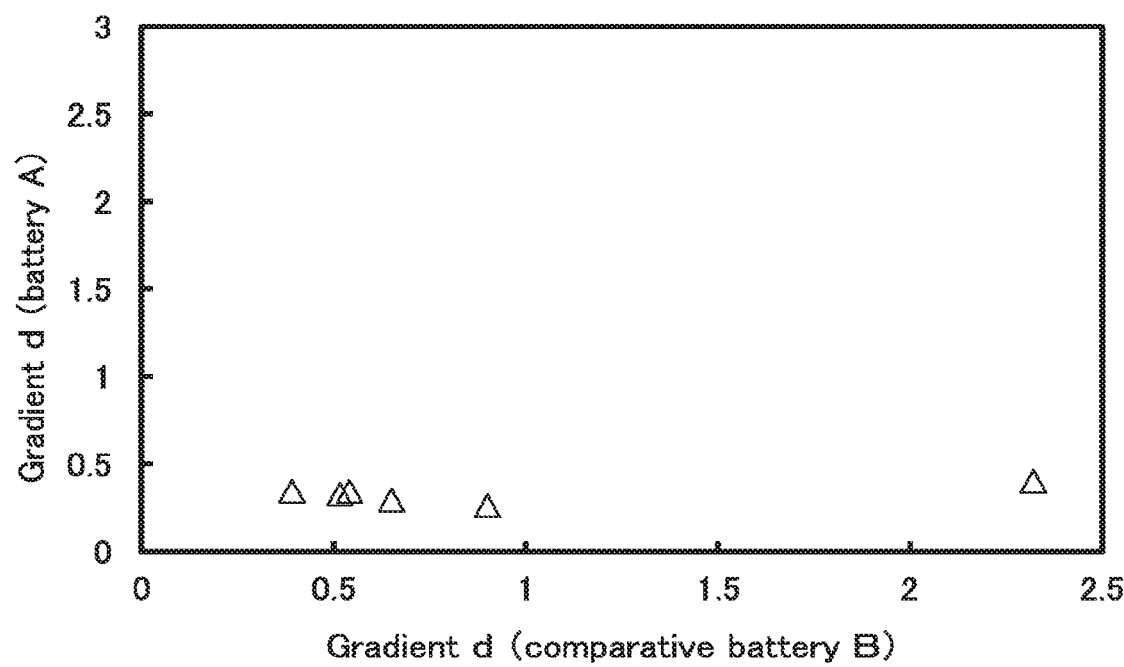
FIGS. 15A and 15B show gradient d of the battery A and the comparative battery B.
Figure 15B:
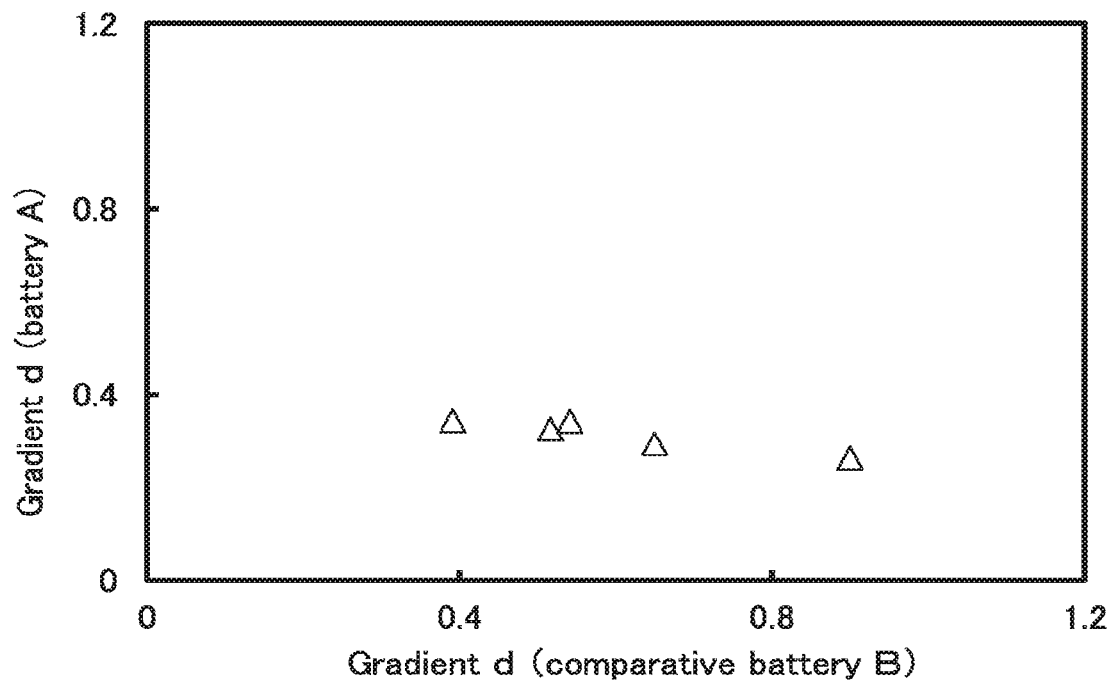

From FIG. 14, the amount of change (gradient d) in discharge voltage with respect to the discharge capacity from 60 mAh/g to 20 mAh/g was calculated. Next, FIG. 15A shows a graph where the gradients d of Comparative Battery B are plotted on the horizontal axis and the gradients d of Battery A are plotted on the vertical axis. FIG. 15B is an enlarged graph of FIG. 15A which shows the gradients d of the batteries in the range of 0 to 1.2.

In each battery, the resistance of the electrode was lower as the gradient d was smaller. This suggests that a high proportion of graphene formed by reduction of graphene oxide reduces the resistance of a positive electrode. In FIGS. 15A and 15B, the gradients d of Comparative Battery B vary because of variations in amount of graphene oxides contained in positive electrodes among the samples. The variations in electric characteristics result from a manufacturing process of graphene oxide. On the other hand, the gradients d are substantially equal to one another among the samples of Battery A as compared with the case of Comparative Battery B. This indicates that the samples of Battery A obtained using chemical reduction treatment had small variations in battery characteristics, which suggests that chemical reduction treatment makes it possible to reduce graphene oxides with small variations.

EXAMPLE 5

In this example, comparison of the amounts of active materials in positive electrodes and the battery characteristics of the storage batteries formed by the method for forming a storage battery electrode of one embodiment of the present invention will be described.
(Fabrication of Storage Battery)

Battery A was fabricated by a fabrication method similar to that in Example 3. Note that the active material content in the positive electrode of Battery A was about 6 mg/cm$^2$ to 7 mg/cm$^2$.

Another battery was fabricated by the fabrication method of Battery A in Example 3 in which the active material content in a positive electrode was increased. Here, an electrode used as the positive electrode is referred to as Electrode B. A method for forming Electrode B will be described. Note that LiPO$_4$ coated with carbon in a stage of solid phase synthesis of LiFePO$_4$ with the use of a raw material to which glucose was added was used as LiFePO$_4$. First, NMP was added as a solvent to LiFePO$_4$ to which graphene oxide was added and the mixture was kneaded until it had the consistency of thick paste. After an NMP solution of PVDF (No. 1100 manufactured by KUREHA CORPORATION) was added as a binder solution to the mixture of graphene oxide and LiFePO$_4$, NMP was further added as a polar solvent and mixing was performed to form slurry. Finally, the ratio of LiFePO$_4$:graphene oxide:PVDF in the slurry was 91.4 wt %:0.6 wt %:8 wt %. The slurry formed by the above method was applied to a current collector and dried at 80° C. in the air for 40 minutes, so that Electrode B where an active material layer was formed over the current collector was formed. The current collector was formed in such a manner that aluminum with a thickness of 20 μm was coated with a mixture of graphite and sodium polyacrylate (90 wt %:10 wt %) to a thickness of about 1 μm with a doctor blade and drying was eventually performed at 80° C. in the air. The active material content in the positive electrode was about 11 mg/cm$^2$.

Next, a positive electrode was formed by performing chemical reduction treatment on Electrode B as in the case of Battery A described in Example 3. The positive electrode was used to fabricate Battery E. The active material content in the positive electrode of Battery E was 8 mg/cm$^2$.

On the other hand, Comparative Battery B was fabricated by a fabrication method similar to that in Example 3. Note that the active material content in a positive electrode of Comparative Battery B was about 6 mg/cm$^2$ to 7 mg/cm$^2$.

Another battery was fabricated by the fabrication method of Comparative Battery B in Example 3 in which the active material content in a positive electrode was increased. Here, a positive electrode was formed by performing thermal reduction treatment on Electrode B. The positive electrode was used to fabricate Comparative Battery F. The active material content in the positive electrode of Comparative Battery F was 9 mg/cm$^2$.
(Comparison of Characteristics and Amounts of Active Materials in Positive Electrodes of Storage Batteries)

Figure 16A:
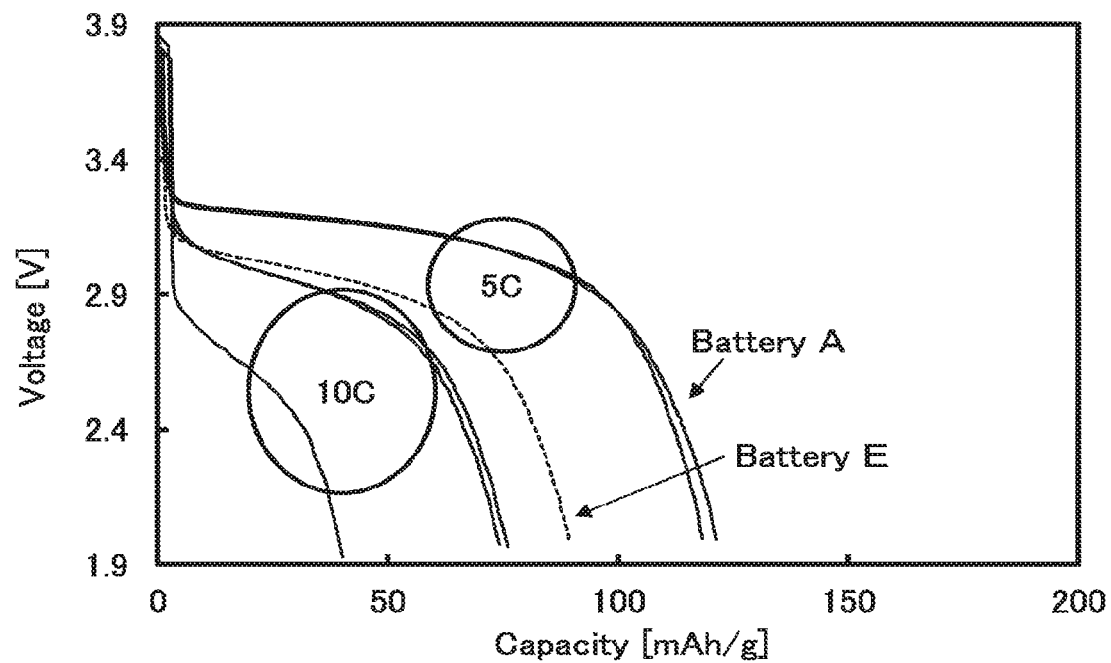
FIG. 16A shows the discharge characteristics of the battery A and a battery E.
Figure 16B:
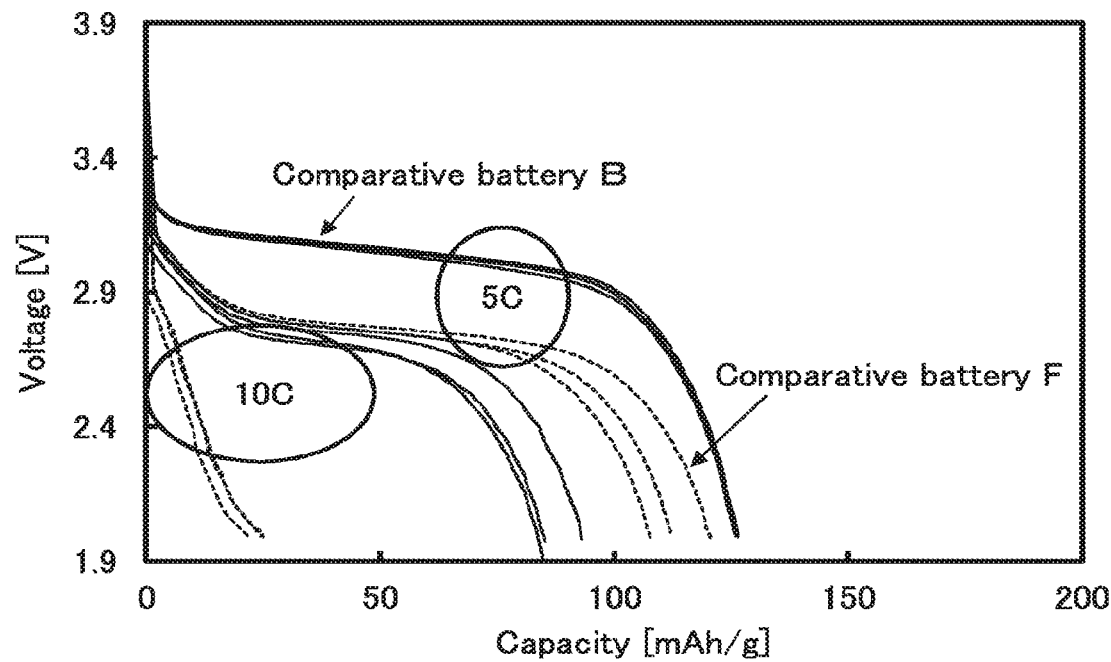
FIG. 16B shows the discharge characteristics of the comparative battery B and a battery F.

FIG. 16A shows measurement results of the constant current discharge characteristics of Battery A and Battery E, and FIG. 16B shows measurement results of the constant current discharge characteristics of Comparative Battery B and Comparative Battery F. The horizontal axis represents discharge capacity (mAh/g) and the vertical axis represents voltage (V). Measurement was carried out under the condition that the discharge rates were 5 C and 10 C. In FIGS. 16A and 16B, thick solid lines show the electric characteristics of Battery A and Comparative Battery B, and dashed lines show the electric characteristics of Battery E and Comparative Battery F.

FIGS. 16A and 16B show that an increase in the active material content leads to reduction in discharge capacity of the positive electrode. When the battery characteristics measured under the condition that the discharge rate was 10 C were compared, the difference between the discharge capacities of Battery A and Battery E was smaller than the difference between the discharge capacities of Comparative Battery B and Comparative Battery F.
(Comparison of Characteristics of Storage Batteries and Reduction Treatment of Graphene Oxides)

Figure 17A:
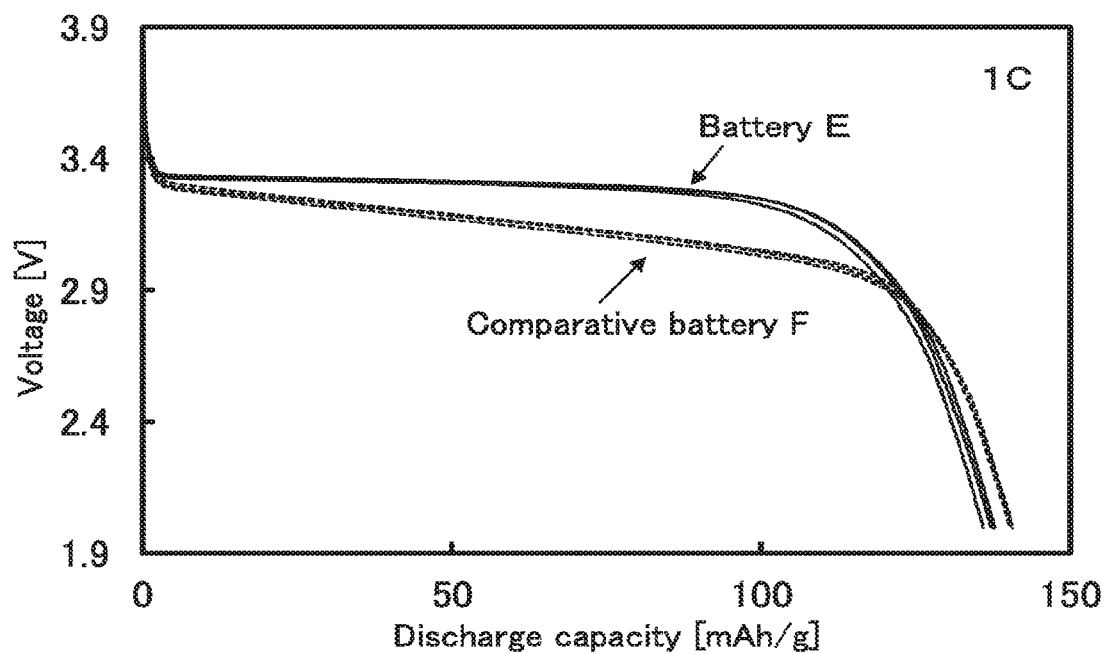
FIGS. 17A and 17B each show the discharge characteristics of the battery E and the comparative battery F.
Figure 17B:
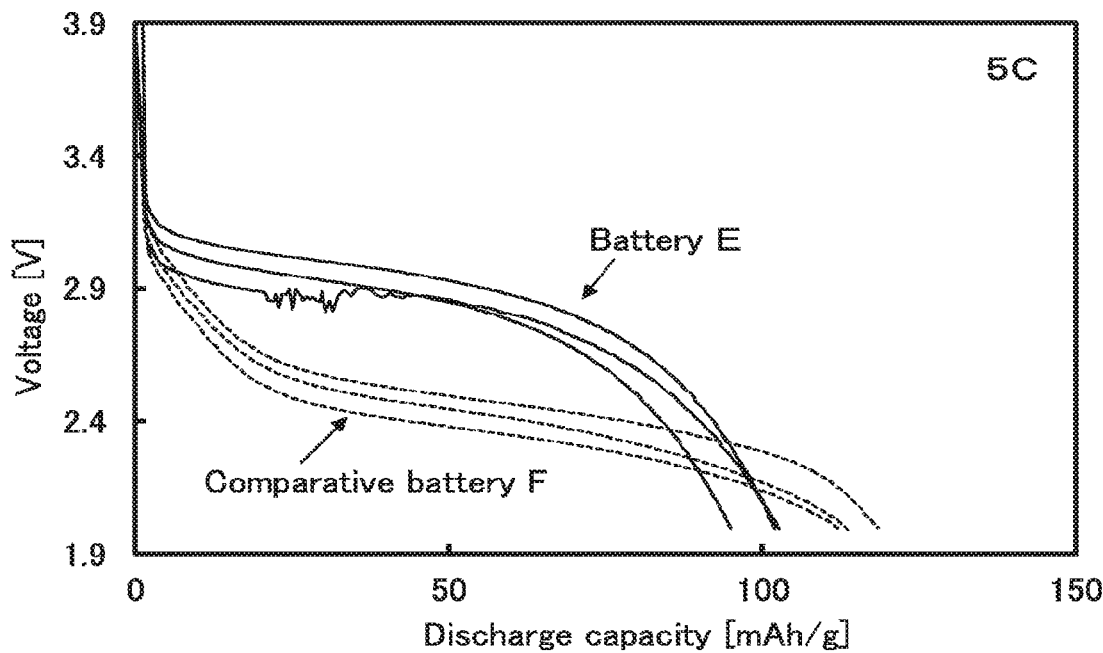

FIGS. 17A and 17B show measurement results of the constant current discharge characteristics of Battery E and Comparative Battery F. The horizontal axis represents discharge capacity (mAh/g) and the vertical axis represents voltage (V). Measurement was carried out under the condition that the discharge rates were 5 C and 10 C. FIG. 17A shows the characteristics of the batteries under the condition that the discharge rate was 1 C and FIG. 17B shows the characteristics of the batteries under the condition that the discharge rate was 5 C. In FIGS. 17A and 17B, a solid line shows the electric characteristics of Battery E, and a dashed line shows the electric characteristics of Comparative Battery F.

As shown in FIG. 17A, the curve of Battery E has a high plateau potential of about 3.4 V and the plateau was maintained until when the discharge capacity exceeded 100 mAh/g. Further, the discharge capacity of Battery E was as high as about 150 mAh/g, which was significantly close to the discharge capacity of Comparative Battery F.

Thus, having discharge capacity equal to or substantially equal to that of Comparative Battery F and small variations in plateau potential, Battery E, which was obtained using chemical reduction treatment, was able to have battery characteristics more excellent than those of Comparative Battery F, which was obtained using thermal reduction treatment. That is to say, the electrode in Comparative Battery F needed thermal treatment at no less than 170° C., whereas the electrode in Battery E which is of equal quality to that in Comparative Battery F was able to be formed at lower than 170° C.

Next, batteries including negative electrodes different from those of Battery E and Comparative Battery F were fabricated and their characteristics were evaluated.

(Fabrication of Storage Batteries)

Battery G was fabricated using a graphite electrode instead of a lithium electrode as a negative electrode by a fabrication method similar to that of Battery E. Comparative Battery H was fabricated using a graphite electrode instead of a lithium electrode as a negative electrode by a fabrication method similar to that of Comparative Battery F.

(Comparison of Characteristics and Reduction Treatment of Graphene Oxides of Storage Batteries)

Figure 18:
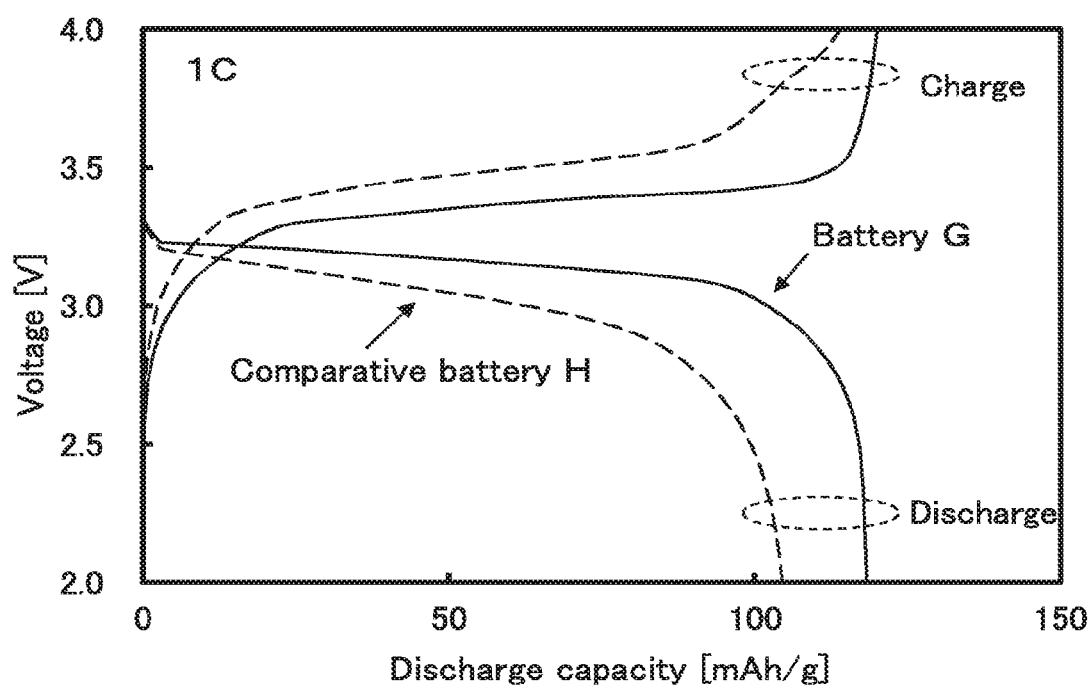
FIG. 18 shows the charge and discharge characteristics of a battery G and a comparative battery H.

FIG. 18 shows measurement results of the constant current charge and discharge characteristics of Battery G and Battery H. The horizontal axis represents discharge capacity (mAh/g) and the vertical axis represents voltage (V). Measurement was carried out under the condition that the charge and discharge rate was 1 C. Note that solid lines show the charge and discharge characteristics of Battery G and dashed lines show the charge and discharge characteristics of Comparative Battery H.

The charge and discharge capacity of Battery G was greater than that of Comparative Battery H. Thus, Battery G, which was obtained using chemical reduction treatment, was able to have battery characteristics more excellent than those of Comparative Battery H, which was obtained using thermal reduction treatment. That is to say, the electrode in Comparative Battery H needed to be subjected to thermal treatment at no less than 170° C., whereas the electrode in Battery G with excellent characteristics was able to be formed at lower than 170° C.

EXAMPLE 6

In this example, evaluation results of power storage device electrodes of embodiments of the present invention will be described.

First, evaluation results of power storage device electrodes containing graphene oxides will be described.

(Formation of Electrodes)

A method for forming an electrode with the use of the graphene oxide dispersion formed in (Formation of Graphene Oxide Dispersion) described in Example 1 will be described.

As an active material, a conductive additive, and a binder used for the electrodes, $LiFePO_4$, graphene oxide (hereinafter referred to as GO), and PVDF were prepared, respectively. Table 3 shows the compounding ratio of $LiFePO_4$: GO:PVDF.

TABLE 3

| | Compounding Ratio | | |
|---|---|---|---|
| | $LiFePO_4$ [wt %] | GO [wt %] | PVDF [wt %] |
| Electrode C1 | 94.8 | 0.2 | 5 |
| Electrode D1 | 94.6 | 0.4 | 5 |
| Electrode E1 | 94.4 | 0.6 | 5 |
| Electrode F1 | 94.2 | 0.8 | 5 |
| Electrode G1 | 94 | 1 | 5 |
| Electrode H1 | 93 | 2 | 5 |
| Electrode I1 | 92 | 3 | 5 |
| Electrode J1 | 91 | 4 | 5 |

A method for forming Electrode C1 will be described. First, NMP was added as a solvent to $LiFePO_4$ to which graphene oxide was added and the mixture was kneaded until it had the consistency of thick paste. After an NMP solution of PVDF (No. 1100 manufactured by KUREHA CORPORATION) was added as a binder solution to the mixture of graphene oxide and $LiFePO_4$, NMP was further added as a polar solvent and mixing was performed to form slurry. The slurry formed by the above method was applied to a current collector (20-μm-thick aluminum coated with about 1-μm-thick acetylene black) and dried at 80° C. in the air for 40 minutes, so that Electrode C1 where an active material layer was formed over the current collector was formed. In addition, Electrodes D1 to J1 in which the compounding ratios were different from that in Electrode C1 were formed similarly to Electrode C1. The active material content was about 9 mg/cm$^2$.

(Formation of Electrodes Using Thermal Reduction Treatment)

Electrodes C2 to J2 in which the compounding ratios were equal to those in Electrodes C1 to J1, respectively, were formed. After that, Electrodes C2 to J2 were subjected to heat treatment at 170° C. in a reduced-pressure atmosphere for 10 hours to reduce graphene oxides.

(Evaluation of Discharge Capacities of Batteries)

Then, stamping was performed so that Electrodes C2 to J2 subjected to thermal reduction treatment have circular shapes. Coin Batteries C1 to J1 were fabricated using the following: Electrodes C2 to J2 subjected to thermal reduction treatment and having circular shapes as respective positive electrodes; metallic lithium for negative electrodes; a mixed solution of ethylene carbonate (EC) and diethyl carbonate (DEC) (with a volume ratio of 1:1) in which lithium hexafluorophosphate ($LiPF_6$) (concentration: 1 mol/L) was dissolved, as electrolytic solutions; and polypropylene (PP) for separators.

Next, the discharge capacities of Batteries C1 to J1 were measured. Note that the discharge rate was 1 C.

Figure 19:
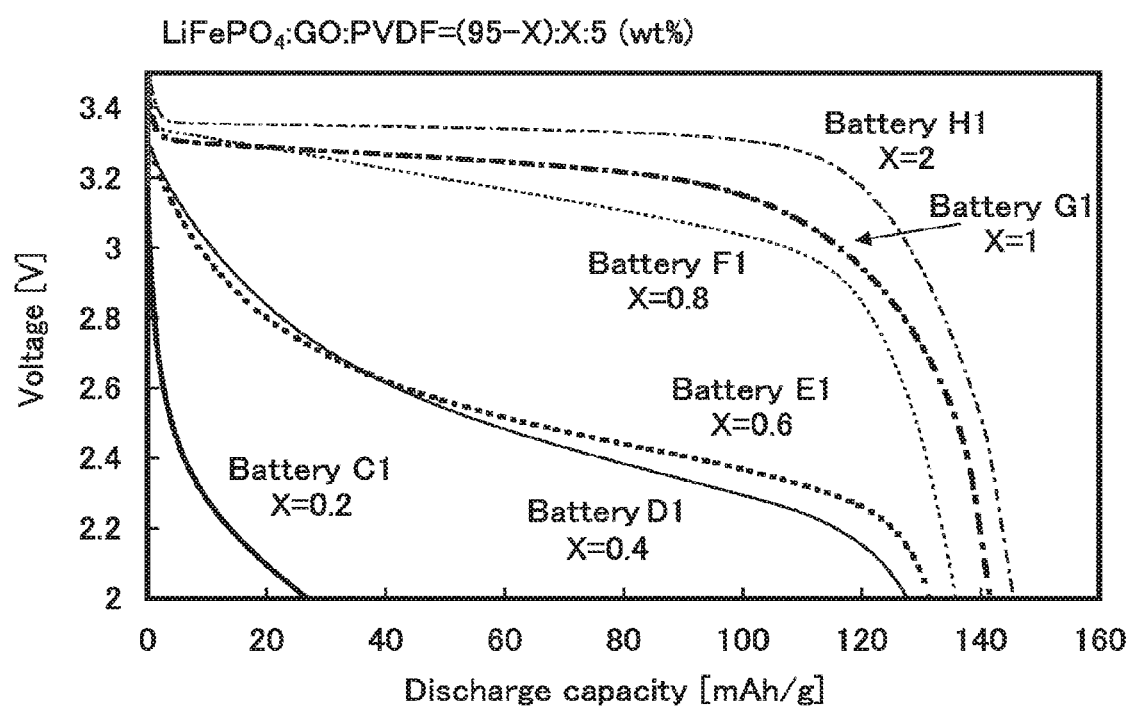
FIG. 19 shows battery characteristics.

FIG. 19 shows discharge capacities per unit amount of the active materials in Batteries C1 to H1. In FIG. 19, the horizontal axis represents discharge capacity (mAh/g) and the vertical axis represents voltage (V).

FIG. 19 shows that an increase in proportion of graphene oxide contained in the active material layer in the electrode increased the discharge capacity and the discharge voltage.

The results in FIG. 19 suggest trade-off between the strength of the electrode and the battery characterictics.

(Formation of Electrodes Using Chemical Reduction Treatment 1)

Electrodes C3 to G3 in which the compounding ratios were equal to those in Electrodes C1 to G1 with high strength, respectively, were formed.

Then, a reducing solution for reducing graphene oxide contained in the electrodes was prepared. A reducing solution used for Chemical Reduction Treatment 1 was prepared by dissolving 77 mM ascorbic acid in an ethanol solution.

Electrodes C3 to G3 were immersed in the obtained reducing solution at 60° C. for 4.5 hours to reduce graphene oxides.

Figure 23A:
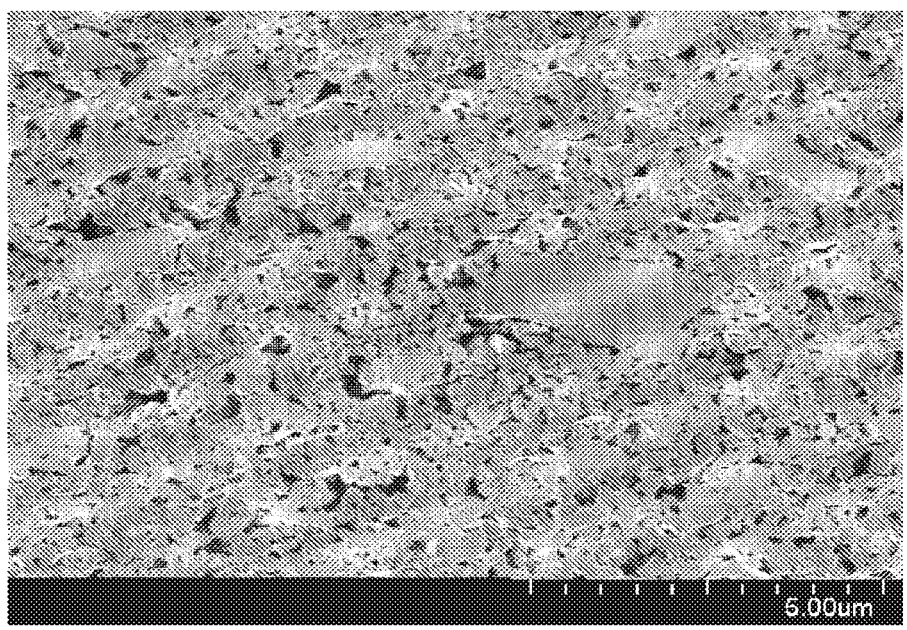
FIGS. 23A and 23B each are a SEM image of a cross section of a positive electrode active material layer.
Figure 23B:
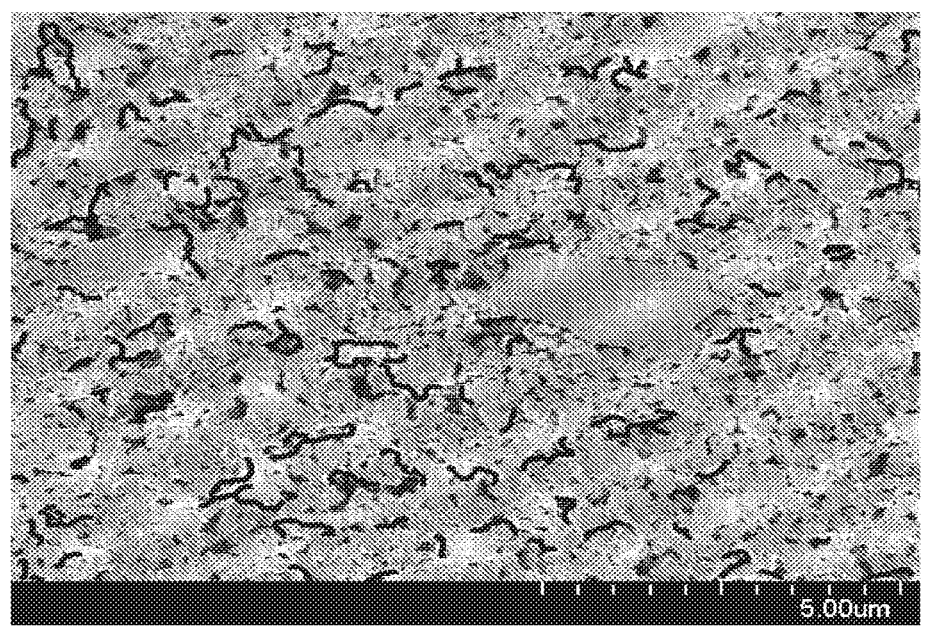

FIGS. 23A and 23B are SEM images showing an observed cross section of Electrode E3. In the SEM images, a plurality of positive electrode active material particles are seen. In part of the images, aggregated positive electrode active material particles can also be seen. Here, white thread-like or string-like portions correspond to graphenes. Note that among the graphenes, a multilayer graphene including fewer layers may fail to be observed in the SEM images. Further, even graphenes which appear to be apart from each other may be connected through a multilayer graphene including fewer layers which fails to be observed by SEM. The graphenes can be seen like a thread or a string in a gap (void) between the plurality of positive electrode active material particles and also adheres to the surfaces of the positive electrode active material particles. In FIG. 23B, some of the graphenes in the SEM image in FIG. 23A are highlighted by heavy lines. The graphenes are found to be three-dimensionally dispersed in the positive electrode active material particles in such a way as to wrap the positive electrode active material particles. The graphenes make surface contact with the plurality of positive electrode active material particles while being in surface contact with each other. Thus, in the positive electrode active material layer, the graphenes are connected to each other and forms a network for electric conduction.

(Evaluation of Discharge Capacities of Batteries)

Then, stamping was performed so that Electrodes C3 to G3 subjected to chemical reduction treatment have circular shapes. Coin Batteries C2 to G2 were fabricated using the following: Electrodes C3 to G3 subjected to chemical reduction treatment and having circular shapes as respective positive electrodes; metallic lithium for negative electrodes; a mixed solution of EC and DEC (with a volume ratio of 1:1) in which $LiPF_6$ (concentration: 1 mol/L) was dissolved, as electrolytic solutions; and PP for separators.

Next, the discharge capacities of Batteries C2 to F2 were measured. Note that the discharge rate was 1 C.

Figure 20A:
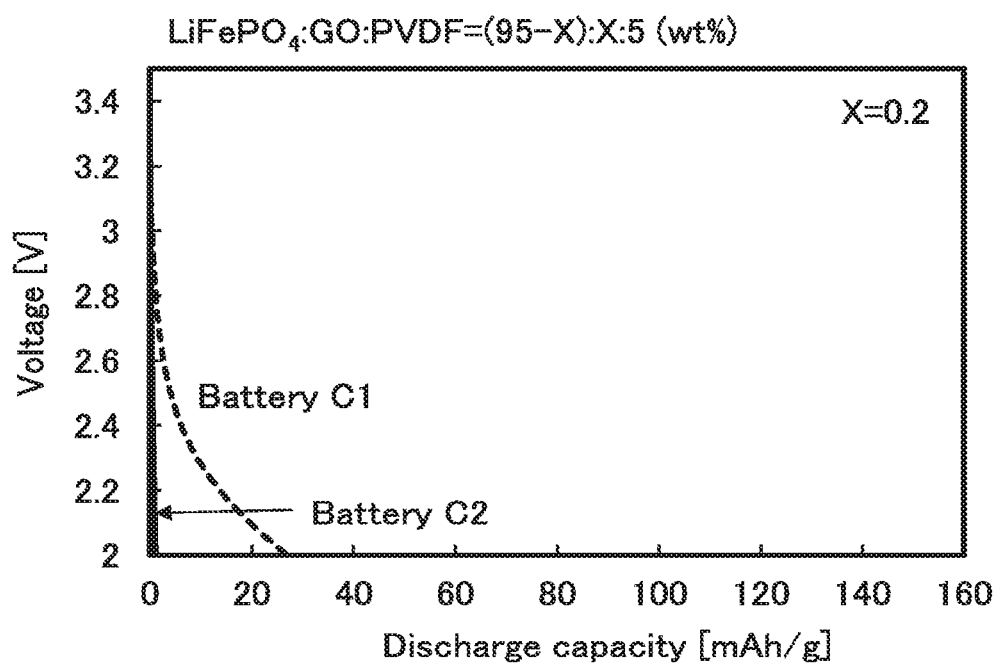
FIGS. 20A and 20B each show battery characteristics.
Figure 20B:
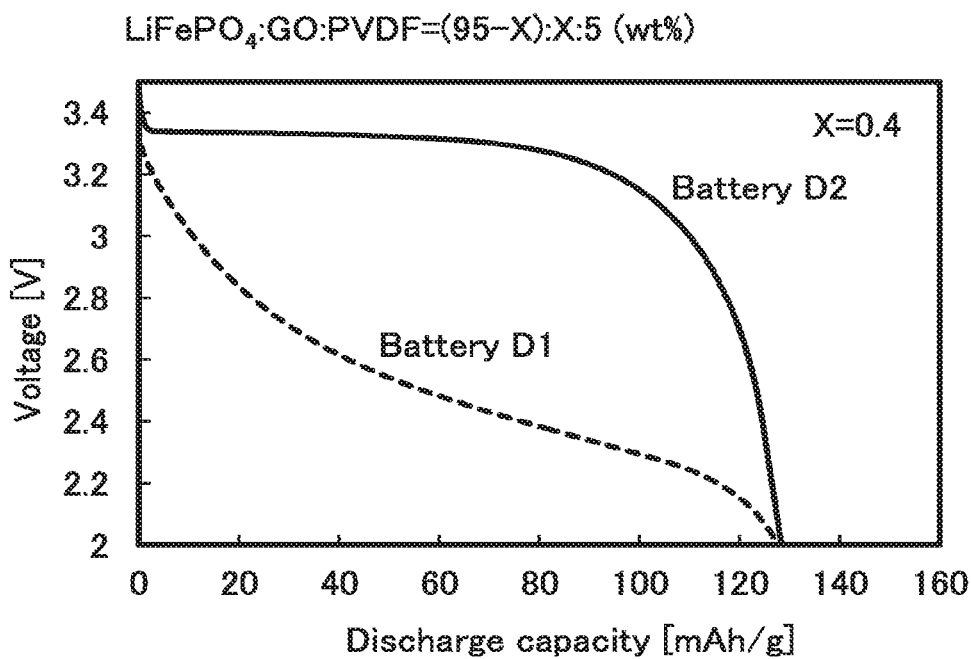
Figure 21A:
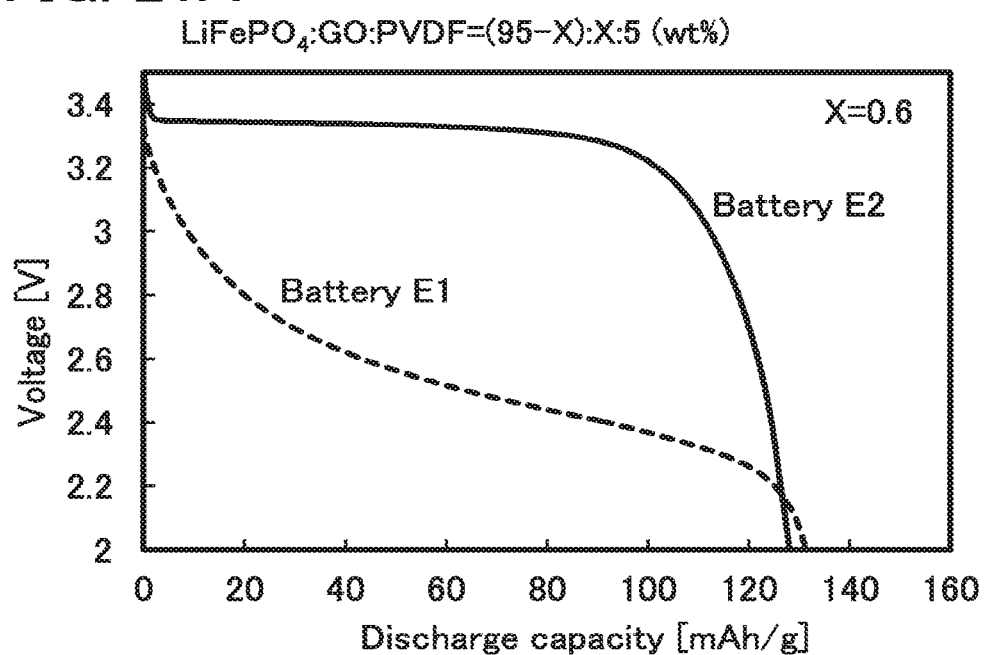
FIGS. 21A and 21B each show battery characteristics.
Figure 21B:
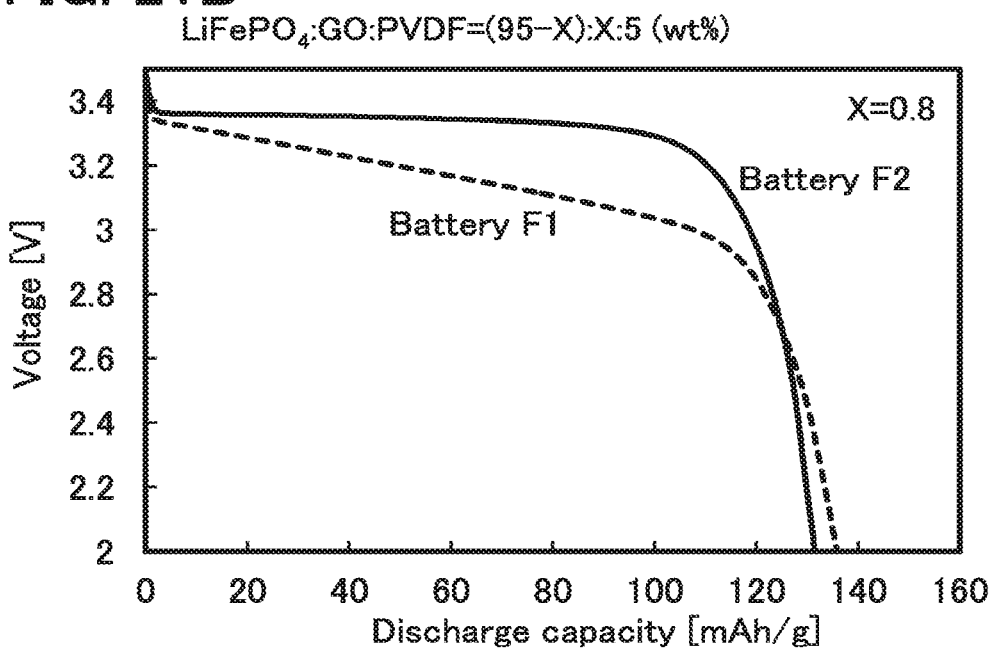

FIGS. 20A and 20B and FIGS. 21A and 21B show discharge capacities per unit amount of the active materials in Batteries C2 to F2. For comparison, discharge capacities per unit amount of the active materials in Batteries C1 to F1 shown in FIG. 19 are also shown. Specifically, FIG. 20A shows the discharge capacities of Battery C1 and Battery C2, FIG. 20B shows the discharge capacities of Battery D1 and Battery D2, FIG. 21A shows the discharge capacities of Battery E1 and Battery E2, and FIG. 21B shows the discharge capacities of Battery F1 and Battery F2. In FIGS. 20A and 20B and FIGS. 21A and 21B, the horizontal axis represents discharge capacity (mAh/g) and the vertical axis represents voltage (V).

The results in FIGS. 20A and 20B and FIGS. 21A and 21B show that an increase in proportion of graphene oxide in Batteries C2 to F2 increased the discharge capacity and the discharge voltage as in the results shown in FIG. 19.

Further, FIG. 20B and FIGS. 21A and 21B show that the discharge voltages of Batteries D2 to F2 including the electrodes subjected to chemical reduction treatment were much higher than those of Batteries D1 to F1, respectively. FIG. 20A shows that the discharge capacities and the discharge voltages of Battery C1 and Battery C2 were low.

The results in FIGS. 20A and 20B and FIGS. 21A and 21B suggest that chemical reduction treatment of the electrode increased the reduction rates of graphene oxides contained in the active material layers of the electrodes, so that the discharge voltages of the batteries were able to be increased. Further, the results of Battery C1 and Battery C2 show that the discharge capacities and the discharge voltages of the batteries were low in the case where the proportion of graphene oxide was 0.2 wt %. This is presumably because in the case where the proportion of graphene oxide was 0.2 wt %, a graphene network was not easily formed even when graphene oxide was reduced.

(Formation of Electrodes Using Chemical Reduction Treatment 2)

Next, Electrode E4 in which the compounding ratio was equal to that in Electrode E1 was formed. Note that a current collector of Electrode E4 was formed in such a manner that aluminum with a thickness of 20 μm was coated with a mixture of acetylene black and PVDF (No. 1100 manufactured by KUREHA CORPORATION) (50 wt %:50 wt %) to a thickness of 2 μm to 8 μm with a doctor blade.

Then, a reducing solution for reducing graphene oxide contained in the electrodes was prepared. A reducing solution used for Chemical Reduction Treatment 2 was prepared by dissolving 77 mM ascorbic acid and 74 mM lithium hydroxide in ultrapure water.

Electrode E4 was immersed in the obtained reducing solution at 60° C. for 30 minutes to reduce graphene oxide.

(Evaluation of Discharge Capacities of Batteries)

Then, Electrode E4 subjected to chemical reduction treatment was stamped into a circular shape. Coin Battery E3 was fabricated using the following: Electrode E4 subjected to chemical reduction treatment and having a circular shape as a positive electrode; metallic lithium for a negative electrode; a mixed solution of EC and DEC (with a volume ratio of 1:1) in which $LiPF_6$ (concentration: 1 mol/L) was dissolved, as an electrolytic solution; and PP for a separator.

Next, the discharge capacity of Battery E3 was measured. Note that the discharge rate was 1 C.

Figure 22:
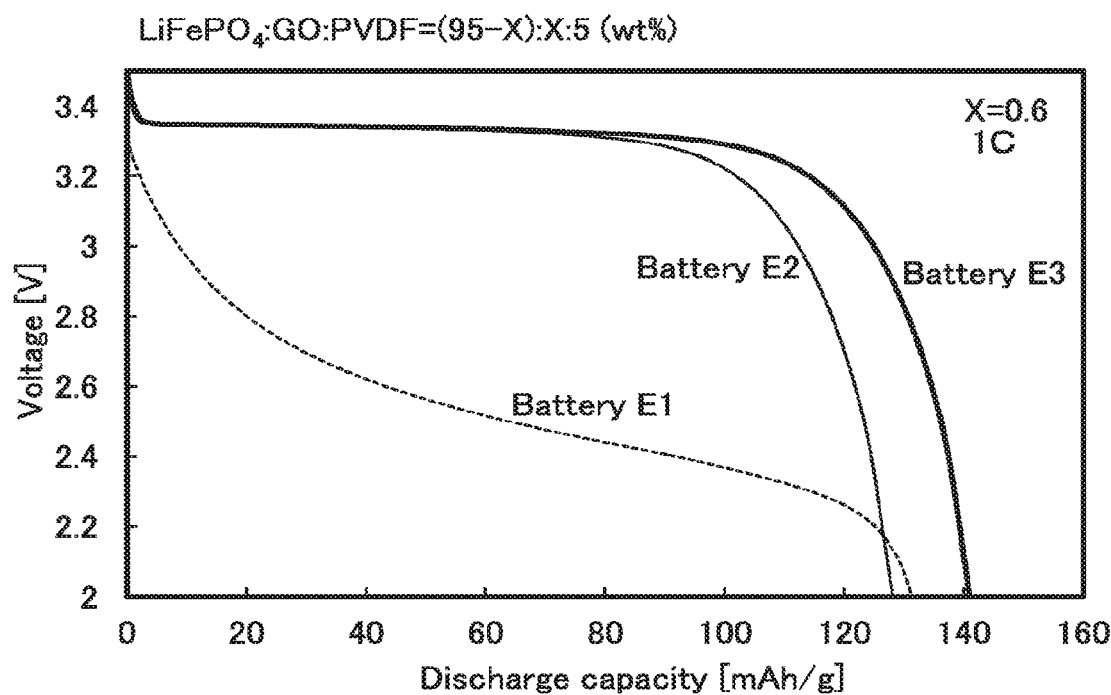
FIG. 22 shows battery characteristics.

FIG. 22 shows discharge capacity per unit amount of the active material in Battery E3. For comparison, discharge capacities per unit amount of the active materials in Battery E1 in FIG. 19 and in Battery E2 in FIG. 21A are also shown. In FIG. 22, the horizontal axis represents discharge capacity (mAh/g) and the vertical axis represents voltage (V).

The results in FIG. 22 shows that the discharge capacity and the discharge voltage of Battery E3 were higher than those of Battery E2.

The discharge capacities and the energy densities of the batteries including the electrodes formed using Chemical Reduction Treatment 1 and Chemical Reduction Treatment 2 were high.

EXAMPLE 7

In this example, part of a reaction mechanism in which graphene is formed from graphene oxide and a quantification method of the impurity concentration of lithium iron phosphate ($LiFePO_4$) will be described.

(Reaction of Ascorbic Acid)

A reaction mechanism in which ascorbic acid reduces graphene oxide so that graphene is formed can be presumably expressed by Equation (B-1) or Equation (B-2), for example. Note that the reaction of the graphene oxide at an end portion thereof is shown for simplification; the reaction inside the graphene oxide is similar to that at the end portion thereof because steric hindrance is less likely to occur. Further, a carbonyl group and an epoxy group also exist as functional groups of graphene oxide; however, a portion containing many hydroxy groups is shown as an example, here.

Equation (B-1) expresses a reaction mechanism in which ascorbic acid provides a proton to graphene oxide so that graphene is formed. Graphene oxide to which a proton is added is dehydrated so that graphene is formed. Note that the reaction velocity depends on a reaction solvent; the reaction velocity in the case of using alcohol as a reaction solvent is higher than that in the case of using an aprotic solvent and the reaction velocity in the case of using water as a reaction solvent is higher than that in the case of using alcohol. Thus, the above reaction mechanism is suggested.

[Chemical Formula 2]

(B-1)

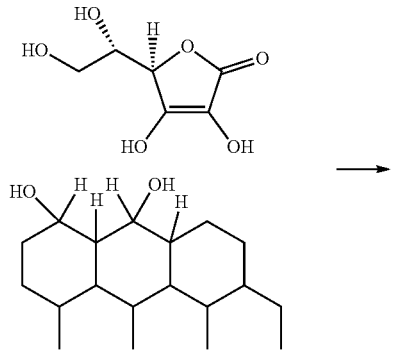

Equation (B-2) expresses a reaction mechanism in which ascorbic acid is added to graphene oxide to form a composite and then dihydroascorbic acid is released from the formed composite, so that graphene is formed.

[Chemical Formula 3]

(B-2)

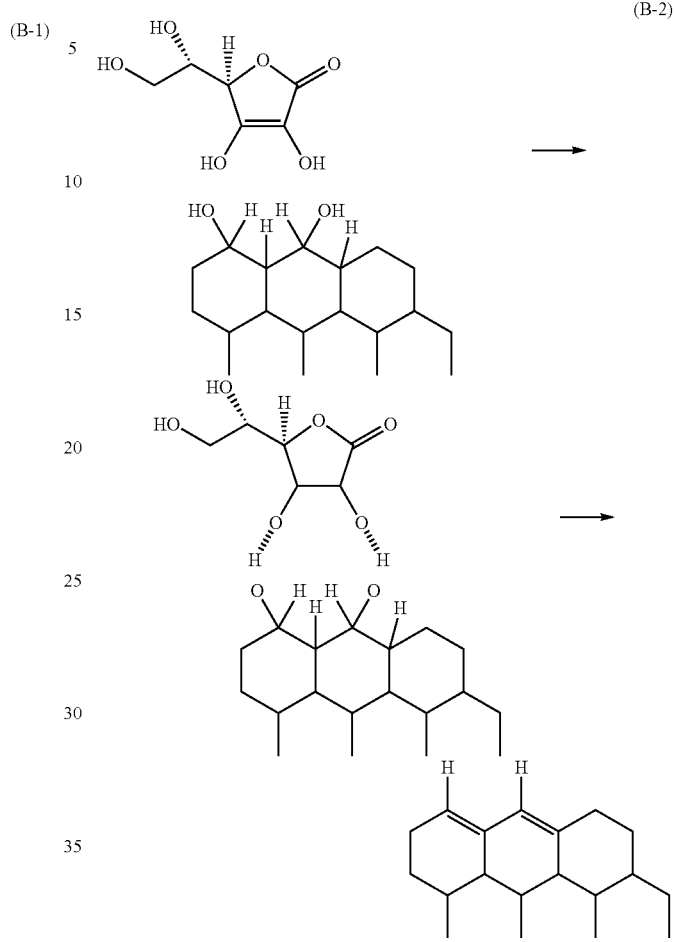

(Color of Ascorbic Acid Solution where Synthesized Lithium Iron Phosphate is Dispersed)

An iron ion in lithium iron phosphate ($LiFePO_4$) is divalent and is easily triply oxidized by oxygen in a synthesis atmosphere to become an impurity.

Trivalent iron ions hinder a battery reaction. Further, the amount of lithium in a positive electrode is reduced; thus, the capacity of a battery is reduced unless lithium is contained in a negative electrode.

As examples of a method for determining an impurity containing trivalent iron ions, an X-ray diffraction method, electron spin resonance, and a magnetic susceptibility measurement method using a superconducting quantum interference device are known.

In this example, a method for easily determining an impurity containing trivalent iron ions by colorimetric measurement of the color of a solution in which a sample is immersed, that is, a method for sensing dissolved trivalent iron ions will be described. Note that the sensitivity may be increased by further addition of an additive.

Lithium iron phosphate ($LiFePO_4$) was synthesized in a nitrogen atmosphere; the synthesized $LiFePO_4$ is referred to as Sample 5. Note that a signal derived from trivalent iron ions was recognized by measurement using electron spin resonance.

The sample 5 was dispersed or immersed in an alcohol solution containing ascorbic acid and heated to 60° C. for 4.5 hours. As a result, the alcohol solution where Sample 5 was dispersed was slightly colored in red.

Lithium iron phosphate ($LiFePO_4$) was synthesized in a nitrogen atmosphere; the synthesized $LiFePO_4$ is referred to as Sample 6. Note that a signal probably derived more significantly from trivalent iron ions than that in the case of Sample 5 was recognized by measurement using electron spin resonance.

The sample 6 was dispersed or immersed in an alcohol solution containing 77 mM ascorbic acid and heated to 60° C. for 4.5 hours. As a result, the alcohol solution where Sample 6 was dispersed was more deeply colored in red than the alcohol solution where Sample 5 was dispersed.

The crystal structures of the lithium iron phosphate ($LiFePO_4$) contained in Sample 5 and Sample 6 were analyzed by an X-ray diffraction method. According to the analysis result, there was no difference between Sample 5 and Sample 6.

The above results show that the amount of impurities containing trivalent iron ions which are contained in a composition can be evaluated using the color of an ascorbic acid-containing solution in which the composition was dispersed or immersed.

(Quantitative Evaluation Method of Trivalent Iron Ions Contained in Power Storage Device Electrode)

The case of application of graphene oxide contained in a mixture over a current collector to a step (Step S15 described in Embodiment 1) where graphene oxide is reacted in a solution containing a reducer will be described.

A sample in which a mixture containing a given amount of lithium iron phosphate ($LiFePO_4$) was formed over a current collector was used as a standard sample and immersed in an ethanol solution containing 77 mM ascorbic acid and heated to 60° C. for 4.5 hours. The lithium iron phosphate ($LiFePO_4$) was synthesized by a solid phase method. The mixture was prepared so as to contain 2 wt % graphene oxide and 5 wt % PVDF (No. 7300 manufactured by KUREHA CORPORATION).

An evaluation sample was formed using lithium iron phosphate ($LiFePO_4$) synthesized in an atmosphere in which the oxygen concentration is higher than that in the atmosphere used in synthesis of the lithium iron phosphate ($LiFePO_4$) used in the standard sample. The evaluation sample was formed over a current collector and immersed in an ascorbic acid solution similarly to the standard sample.

When the samples, which are electrodes with the same weight, were immersed in reducing solutions with the same volume, there was a difference in color of the reducing solution after the immersion between the evaluation sample and the standard sample. Specifically, the solution where the evaluation sample was immersed became a red solution having an absorption peak higher than that of the solution where the standard sample was immersed, at 490 nm. Note that ascorbic acid is a weak reducer; thus, there was not a significant difference in absorbance after about one-hour immersion.

The standard sample and the evaluation sample were used to fabricate respective batteries and the discharge capacities of the batteries were measured. The difference in discharge capacity between the batteries under the condition that the discharge rate was 0.2 C was about 5 mA/g to 10 mA/g.

Even in the case where the evaluation sample was formed using thermal reduction treatment at 170° C. in a reduced pressure environment for 10 hours instead of chemical reduction treatment, there was little difference in discharge capacity between batteries including the samples.

The above results suggest that the lithium iron phosphate ($LiFePO_4$) was inactivated by the impurity.

This application is based on Japanese Patent Application serial no. 2012-136194 filed with the Japan Patent Office on Jun. 15, 2012 and Japanese Patent Application serial no. 2013-054310 filed with the Japan Patent Office on Mar. 15, 2013, the entire contents of which are hereby incorporated by reference.

What is claimed is:

1. A method for manufacturing a storage battery, comprising the steps of:
   forming a first mixture comprising an active material, graphene oxide and a solvent;
   evaporating the solvent in the first mixture so as to form a second mixture comprising the active material and graphene oxide;
   consolidating the second mixture by pressing after evaporating the solvent; and
   reducing the graphene oxide in the second mixture to form a graphene,
   wherein the step of reducing the graphene oxide is performed in a polar solvent comprising a reducer.

2. The method for manufacturing a storage battery, according to claim 1, wherein the graphene comprises oxygen after the step of reducing the graphene oxide.

3. The method for manufacturing a storage battery, according to claim 2, wherein a proportion of the oxygen is higher than or equal to 2 at. % and lower than or equal to 20 at. % in the graphene.

4. The method for manufacturing a storage battery, according to claim 1, wherein the reducer comprises at least one of ascorbic acid, hydrazine, dimethyl hydrazine, hydroquinone, tetra butyl ammonium bromide, $NaBH_4$, $LiAlH_4$, ethylene glycol, polyethylene glycol, and N,N-diethylhydroxylamine.

5. The method for manufacturing a storage battery, according to claim 1,
   wherein the polar solvent comprises at least one of water, methanol, ethanol, acetone, tetrahydrofuran, dimethylformamide, N-methylpyrrolidone, and dimethyl sulfoxide.

6. The method for manufacturing a storage battery, according to claim 1, wherein the active material comprises lithium.

7. The method for manufacturing a storage battery, according to claim 1, wherein the step of reducing the graphene oxide is performed at higher than or equal to room temperature and lower than or equal to 150 ° C.

8. The method for manufacturing a storage battery, according to claim 1, wherein the step of consolidating the second mixture is performed after the step of reducing the graphene oxide.

9. An electronic device comprising the storage battery according to claim 1.

10. A method for manufacturing a storage battery, comprising the steps of:
    forming a first mixture comprising an active material, graphene oxide, and a solvent;
    evaporating the solvent in the first mixture so as to form a second mixture comprising the active material and the graphene oxide;
    consolidating the second mixture by pressing after evaporating the solvent; and
    reducing the graphene oxide in the second mixture to form a graphene, wherein the step of reducing the graphene oxide is performed by immersing the second mixture in a polar solvent comprising a reducer.

11. The method for manufacturing a storage battery, according to claim 10, wherein the reduced graphene oxide comprises oxygen after the step of reducing the graphene oxide.

12. The method for manufacturing a storage battery, according to claim 11 wherein a proportion of the oxygen is higher than or equal to 2 at. % and lower than or equal to 20 at. % in the reduced graphene oxide.

13. The method for manufacturing a storage battery, according to claim 10, wherein the reducer comprises at least one of ascorbic acid, hydrazine, dimethyl hydrazine, hydroquinone, tetra butyl ammonium bromide, $NaBH_4$, $LiAlH_4$, ethylene glycol, polyethylene glycol, and N,N-diethylhydroxylamine.

14. The method for manufacturing a storage battery, according to claim 10, wherein the polar solvent comprises at least one of water, methanol, ethanol, acetone, tetrahydrofuran, dimethylformamide, N-methylpyrrolidone, and dimethyl sulfoxide.

15. The method for manufacturing a storage battery, according to claim 10, wherein the active material comprises lithium.

16. The method for manufacturing a storage battery, according to claim 10, wherein the step of reducing the graphene oxide is performed at higher than or equal to room temperature and lower than or equal to 150 ° C.

17. The method for manufacturing a storage battery, according to claim 10, wherein the step of consolidating the second mixture is performed after the step of reducing the graphene oxide.

18. An electronic device comprising the storage battery according to claim 10.

19. The method for manufacturing a storage battery, according to claim 1,
wherein the first mixture further comprises a binder.

20. The method for manufacturing a storage battery, according to claim 10,
wherein the first mixture further comprises a binder.

* * * * *